United States Patent
Lu et al.

(10) Patent No.: US 11,943,643 B2
(45) Date of Patent: Mar. 26, 2024

(54) WIDE BANDWIDTH TRANSMISSION SCHEMES

(71) Applicant: MediaTek Singapore Pte. Ltd., Singapore (SG)

(72) Inventors: Kai Ying Lu, San Jose, CA (US); Yongho Seok, San Jose, CA (US); Hung-Tao Hsieh, Hsinchu (TW); Cheng-Yi Chang, Hsinchu (TW); James Chih-Shi Yee, San Jose, CA (US); Jianhan Liu, San Jose, CA (US); Po-Yuen Cheng, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 160 days.

(21) Appl. No.: 17/381,859

(22) Filed: Jul. 21, 2021

(65) Prior Publication Data
US 2022/0030450 A1    Jan. 27, 2022

Related U.S. Application Data

(60) Provisional application No. 63/055,928, filed on Jul. 24, 2020.

(51) Int. Cl.
*H04W 24/08* (2009.01)
*H04L 1/00* (2006.01)
(Continued)

(52) U.S. Cl.
CPC ........... *H04W 24/08* (2013.01); *H04L 1/0008* (2013.01); *H04L 1/0068* (2013.01);
(Continued)

(58) Field of Classification Search
None
See application file for complete search history.

(56) References Cited

U.S. PATENT DOCUMENTS

| 2018/0014327 A1 | 1/2018 | Park |
| 2018/0132278 A1 | 5/2018 | Oteri et al. |

(Continued)

FOREIGN PATENT DOCUMENTS

| CN | 106716900 A | 5/2017 |
| CN | 107409324 A | 11/2017 |
| CN | 107409396 A | 11/2017 |

OTHER PUBLICATIONS

Taiwan Intellectual Property Office, Office Action for Taiwan Patent Application No. 110127096, dated May 11, 2022.

(Continued)

*Primary Examiner* — Saumit Shah
(74) *Attorney, Agent, or Firm* — Han IP PLLC; Andy M. Han

(57) ABSTRACT

An access point (AP) and a station (STA) communicate with each other, with the AP indicating to the STA either or both of a preamble detection (PD) channel and a signaling (SIG) content channel and with the STA being initially monitoring a primary frequency segment of a plurality of frequency segments in an operating bandwidth of the AP. A downlink (DL) or triggered uplink (UL) communication is performed between the AP and the STA during a transmission opportunity (TXOP) such that: (i) during the TXOP, the STA monitors a preamble on the PD channel and decodes a SIG content on the SIG content channel; and (ii) after an end of the TXOP, the STA switches to the primary frequency segment.

18 Claims, 16 Drawing Sheets

(51) Int. Cl.
*H04L 1/1867* (2023.01)
*H04W 52/02* (2009.01)
*H04W 74/0816* (2024.01)

(52) U.S. Cl.
CPC ....... *H04L 1/1896* (2013.01); *H04W 52/0216* (2013.01); *H04W 74/0816* (2013.01)

(56) References Cited

U.S. PATENT DOCUMENTS

| | | | |
|---|---|---|---|
| 2019/0141570 A1* | 5/2019 | Verma | H04W 28/065 |
| 2020/0037395 A1 | 1/2020 | Ko et al. | |
| 2021/0273757 A1* | 9/2021 | Shellhammer | H04L 5/0044 |
| 2023/0016370 A1* | 1/2023 | Kim | H04L 5/0007 |

OTHER PUBLICATIONS

European Patent Office, Extended European Search Report for European Patent Application No. 21187406.0, dated Dec. 20, 2021.
China National Intellectual Property Administration, First Office Action in China Patent Application No. 202110841891.3, dated May 31, 2023.

* cited by examiner

1500

COMMUNICATE BETWEEN AN ACCESS POINT (AP) AND A STATION (STA), WHICH INITIALLY MONITORS AN INITIAL PREAMBLE DETECTION (PD) CHANNEL AND AN INITIAL SIGNALING (SIG) CONTENT CHANNEL IN A SAME FREQUENCY SEGMENT OR DIFFERENT FREQUENCY SEGMENTS OF A PLURALITY OF FREQUENCY SEGMENTS IN AN OPERATING BANDWIDTH OF THE AP, WITH THE AP ASSIGNING TO THE STA EITHER OR BOTH OF A PD CHANNEL AND A SIG CONTENT CHANNEL FOR A TRANSMISSION OPPORTUNITY (TXOP), THE PD CHANNEL AND THE SIG CONTENT CHANNEL ASSIGNED BY THE AP BEING DIFFERENT FROM THE INITIAL PD CHANNEL AND THE INITIAL SIG CONTENT CHANNEL, RESPECTIVELY
1510

PERFORM A FRAME EXCHANGE BETWEEN THE AP AND THE STA DURING THE TXOP SUCH THAT THE STA MONITORS A PREAMBLE ON THE PD CHANNEL AND DECODES A SIG CONTENT ON THE SIG CONTENT CHANNEL
1520

ESTABLISH A WIRELESS COMMUNICATION BETWEEN AN ACCESS POINT (AP) AND A FIRST STATION (STA) WITH THE FIRST STA INITIALLY MONITORING A PRIMARY FREQUENCY SEGMENT OF A PLURALITY OF FREQUENCY SEGMENTS IN AN OPERATING BANDWIDTH OF THE AP IN A BASIC SERVICE SET (BSS) WHICH IS ASSOCIATED WITH A PLURALITY OF STAs INCLUDING THE FIRST STA
1610

COMMUNICATE BETWEEN THE AP AND THE FIRST STA TO RESULT IN THE FIRST STA BEING ASSIGNED EITHER OR BOTH OF A FIRST PREAMBLE DETECTION (PD) CHANNEL AND A FIRST SIGNALING (SIG) CONTENT CHANNEL SUCH THAT THE FIRST STA MONITORS A PREAMBLE ON THE FIRST PD CHANNEL AND DECODES A SIG CONTENT ON THE FIRST SIG CONTENT CHANNEL DURING AT LEAST A PREDETERMINED PERIOD OF TIME
- RESPONSIVE TO A FIRST BANDWIDTH OF THE FIRST STA BEING DIFFERENT THAN A SECOND BANDWIDTH OF A SECOND STA OF THE PLURALITY OF STAs, AT LEAST ONE OF A SECOND PD CHANNEL AND A SECOND SIG CONTENT CHANNEL ASSIGNED TO THE SECOND STA AND AT LEAST ONE OF THE FIRST PD CHANNEL AND THE FIRST SIG CONTENT CHANNEL ARE IN DIFFERENT FREQUENCY SEGMENTS OF THE PLURALITY OF FREQUENCY SEGMENTS; OR
- RESPONSIVE TO A FIRST TYPE OF THE FIRST STA BEING DIFFERENT THAN A SECOND TYPE OF THE SECOND STA, THE FIRST SIG CONTENT CHANNEL IS IN ONE OF THE PLURALITY OF FREQUENCY SEGMENTS OTHER THAN THE PRIMARY FREQUENCY SEGMENT

WIDE BANDWIDTH TRANSMISSION SCHEMES

CROSS REFERENCE TO RELATED PATENT APPLICATION

The present disclosure is part of a non-provisional patent application claiming the priority benefit of U.S. Provisional Patent Application No. 63/055,928, filed 24 Jul. 2020, the content of which being incorporated by reference in its entirety.

TECHNICAL FIELD

The present disclosure is generally related to wireless communications and, more particularly, to wide bandwidth transmission schemes in wireless communications.

BACKGROUND

Unless otherwise indicated herein, approaches described in this section are not prior art to the claims listed below and are not admitted as prior art by inclusion in this section.

In next-generation wireless communications such as those in extreme-high-throughput (EHT) wireless local area networks (WLANs) based on an Institute Electrical and Electronics Engineers (IEEE) standard including IEEE 802.11be and beyond, for a wide-bandwidth operating system (e.g., a basic service set (BSS) with a 320 MHz bandwidth), it is possible that multiple different bandwidths (e.g., 80 MHz, 160 MHz, 240 MHz and 320 MHz) and different types (e.g., legacy high-efficiency (HE) devices and EHT devices) of non-access point (non-AP) stations (STAs) could be associated with the same BSS. It would be better for non-AP STAs to be able to monitor the primary 20 MHz channel so that they can remain associated with the BSS to perform enhanced distributed channel access (EDCA)-based channel access for transmissions. However, when a multi-user transmission is intended for non-AP STAs of mixed types and/or different bandwidths, some STAs might need to monitor non-primary channels to detect preamble and decode signaling content in order to support flexible scheduling, aggregated physical-layer protocol data units (PPDUs) with different formats, dynamic channel puncturing, and/or signaling content load balancing, among other activities. Therefore, there is a need for a solution of wide bandwidth transmission schemes to address this issue.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to wide bandwidth transmission schemes in wireless communications. Under various proposed schemes in accordance with the present disclosure, it is believed that aforementioned issue may be addressed or otherwise alleviated.

In one aspect, a method may involve communicating between an AP and a STA, which initially monitors an initial preamble detection (PD) channel and an initial signaling (SIG) content channel in a same frequency segment or different frequency segments of a plurality of frequency segments in an operating bandwidth of the AP, with the AP assigning to the STA either or both of a PD channel and a SIG content channel within a transmission opportunity (TXOP), the PD channel and the SIG content channel assigned by the AP being different from the initial PD channel and the initial SIG content channel, respectively. The method may also involve performing a frame exchange between the AP and the STA during the TXOP such that the STA monitors a preamble on the PD channel and decodes a SIG content on the SIG content channel.

In another aspect, a method may involve establishing a wireless communication between an AP and a first STA with the first STA initially monitoring a primary frequency segment of a plurality of frequency segments in an operating bandwidth of the AP in a BSS which is associated with a plurality of STAs including the first STA. The method may also involve communicating between the AP and the first STA to result in the first STA being assigned either or both of a first preamble detection (PD) channel and a first signaling (SIG) content channel such that the first STA monitors a preamble on the first PD channel and decodes a SIG content on the first SIG content channel during at least a predetermined period of time. In response to a first bandwidth of the first STA being different than a second bandwidth of a second STA of the plurality of STAs, at least one of a second PD channel and a second SIG content channel assigned to the second STA and at least one of the first PD channel and the first SIG content channel may be in different segments of the plurality of frequency segments. In response to a first type of the first STA being different than a second type of the second STA, the first SIG content channel may be in one of the plurality of frequency segments other than the primary frequency segment.

In yet another aspect, an apparatus implementable in a STA may include a transceiver and a processor coupled to the transceiver. The transceiver may be configured to wirelessly communicate with an AP. The processor may be configured to communicate, via the transceiver, between the AP and the STA, which initially monitors an initial PD channel and an initial SIG content channel in a same frequency segment or different frequency segments of a plurality of frequency segments in an operating bandwidth of the AP, with the AP assigning to the STA either or both of a PD channel and a SIG content channel for a TXOP, the PD channel and the SIG content channel assigned by the AP being different from the initial PD channel and the initial SIG content channel, respectively. The processor may be also configured to perform, via the transceiver, a frame exchange between the AP and the STA during a TXOP such that the STA monitors a preamble on the PD channel and decodes a SIG content on the SIG content channel.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 15 is a flowchart of an example process in accordance with an implementation of the present disclosure.

FIG. 16 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to wide bandwidth transmission schemes in wireless communications. According to the present disclosure, a number of possible solutions may be implemented separately or jointly. That is, although these possible solutions may be described below separately, two or more of these possible solutions may be implemented in one combination or another.

Figure 1:
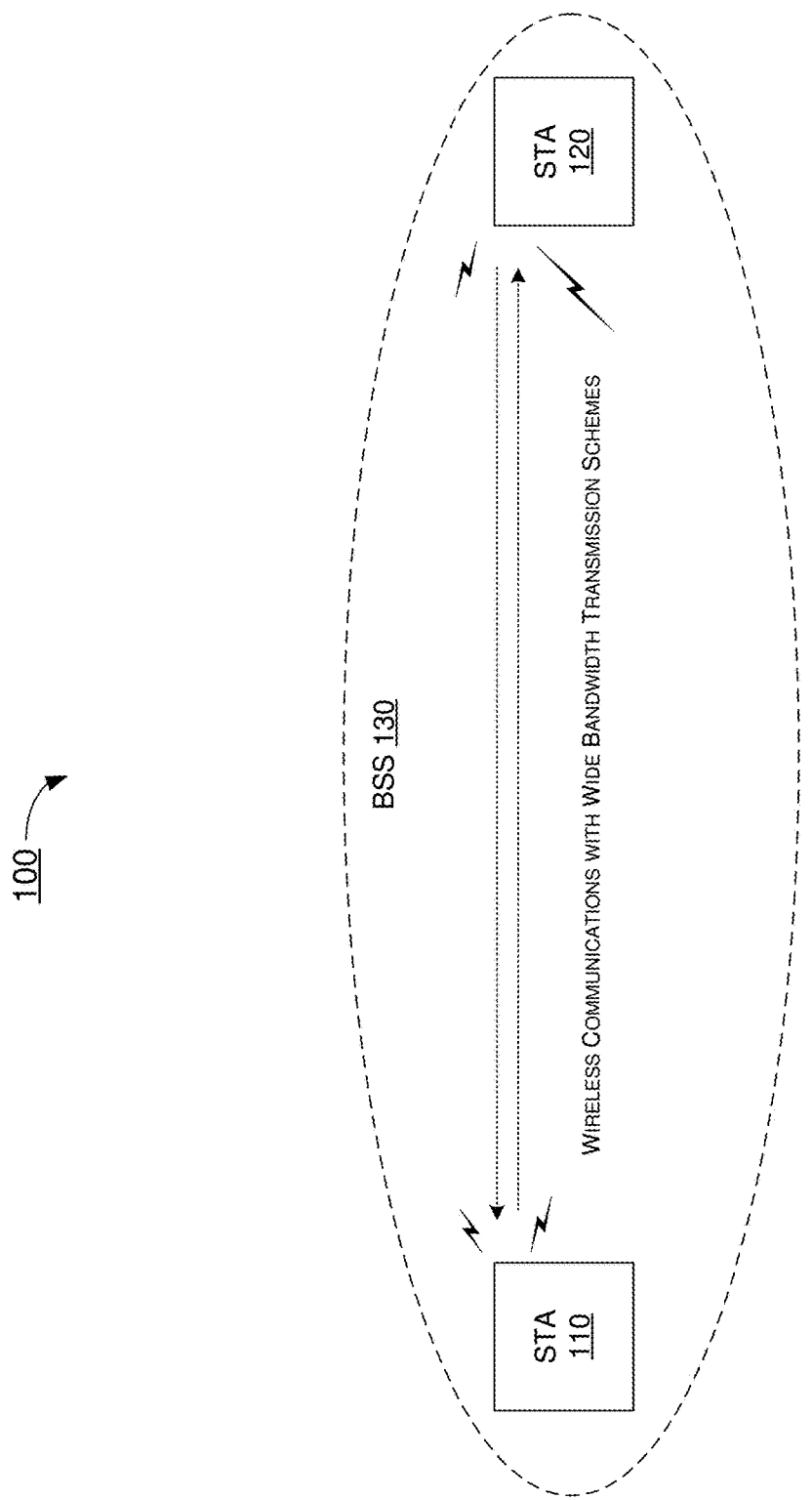
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 16 illustrate examples of implementation of various proposed schemes in network environment 100 in accordance with the present disclosure. The following description of various proposed schemes is provided with reference to FIG. 1~FIG. 16.

Referring to FIG. 1, network environment 100 may involve at least a STA 110 and a STA 120 communicating wirelessly with each other in a wide-bandwidth BSS 130 in accordance with one or more IEEE 802.11 standards (e.g., IEEE 802.11be and beyond). Each of STA 110 (herein interchangeably denoted as "STA1") and STA 120 (herein interchangeably denoted as "STA2") may function as an access point (AP) STA or a non-AP STA. Moreover, each of STA 110 and STA 120 may be configured to perform wide bandwidth transmission schemes in wireless communications in accordance with various proposed schemes described below. It is noteworthy that, in the present disclosure, the term "primary channel" refers to a 20 MHz channel where medium access through channel contention is allowed. The term "non-primary channel" refers to a 20 MHz channel which is not a primary channel in an operating channel. The term "primary frequency segment" refers to a frequency segment (e.g., an 80 MHz frequency segment) within an operating bandwidth (e.g., 80 MHz, 160 MHz, 80+80 MHz, 240 MHz, 160+80 MHz, 320 MHz or 160+160 MHz) that contains the primary channel. The term "secondary segment" refers to a frequency segment (e.g., an 80 MHz frequency segment) within the operating bandwidth that does not contain the primary channel.

In wide-bandwidth BSS 130, an AP (e.g., STA 110 functioning as an AP STA) may assign or negotiate with a non-AP STA (e.g., STA 120 functioning as a non-AP STA) regarding which channel(s) to be used as the PD channel and SIG content channel. The PD channel and SIG content channel may be located in the same bandwidth segment (e.g., a 80 MHz segment) or different bandwidth segments. The PD channel and SIG content channel of a non-AP STA may be semi-statically assigned or negotiated. Alternatively, the PD channel and SIG content channel of a non-AP STA may be dynamically assigned by the associated AP.

Under a proposed scheme in accordance with the present disclosure, the semi-static PD and SIG content channel assignment may be within a certain period of time such as, for example and without limitation, a target wakeup time (TWT) or a service period (SP). The assignment may be changed by re-assignment or re-negotiation through frame exchange (e.g., via management frame exchange and/or control frame exchange).

Under the proposed scheme, the dynamic PD and SIG content channel assignment may be applied when there will be data transmission between an AP (e.g., STA 110) and its associated non-AP STA(s) (e.g., STA 120) within a TXOP. A control frame or control information may be used by the AP to indicate the position of the PD channel and SIG content channel for a corresponding non-AP STA which is the recipient of the data to be transmitted. The control frame or control information may be sent by the AP before the data transmission for the corresponding non-AP STA in order to assign the PD channel and/or SIG content channel for the non-AP STA to detect and decode the subsequent data within a current TXOP. The dynamic PD and SIG content channel assignment may be valid within the current TXOP.

Under a proposed scheme in accordance with the present disclosure with respect to semi-static PD and SIG content channel assignment with various-bandwidth STAs, an AP (e.g., STA 110) may be operating in a wide bandwidth (e.g., 320 MHz) with four 80 MHz segments, including a primary 80 MHz segment (herein interchangeably denoted as "P80"), a first secondary 80 MHz segment (herein interchangeably denoted as "S80_1"), a second secondary 80 MHz segment (herein interchangeably denoted as "S80_2"), and a third secondary 80 MHz segment (herein interchangeably denoted as "S80_3").

Figure 2:
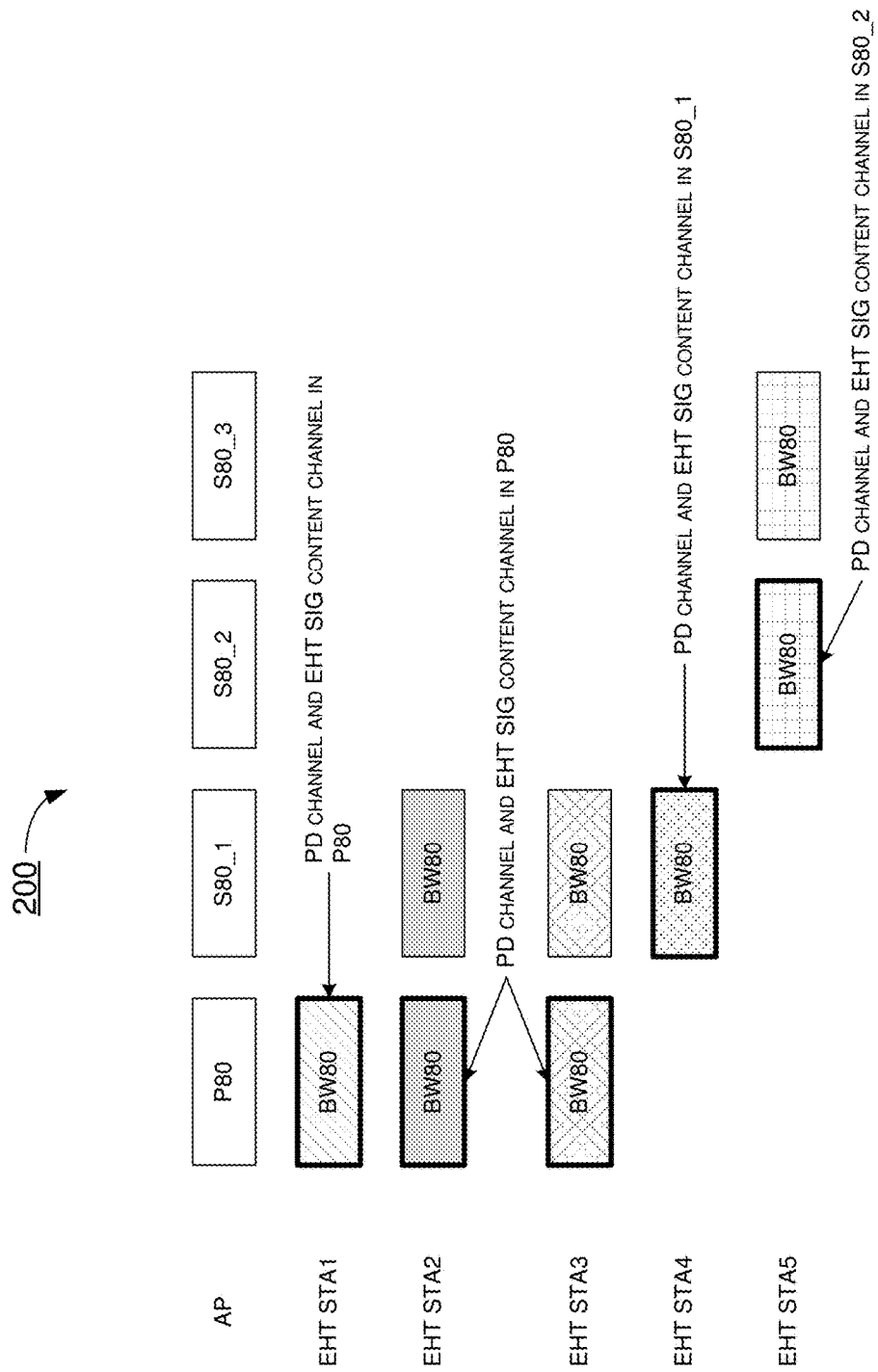
FIG. 2 is a diagram of an example scenario in accordance with the present disclosure.

FIG. 2 illustrates an example scenario 200 of semi-static PD and SIG content channel assignment with STAs of various bandwidths under the proposed scheme. Scenario 200 may involve multiple non-AP STAs with different operating bandwidths such as EHT STA1, EHT STA2, EHT STA3, EHT STA4 and EHT STA5. In scenario 200, EHT STA1 may be capable of operating in an 80 MHz bandwidth, EHT STA2 may be capable of operating in a 160 MHz bandwidth, EHT STA3 may be capable of operating in a 160 MHz bandwidth, EHT STA4 may be capable of operating in an 80 MHz bandwidth, and EHT STA5 may be capable of operating in a 160 MHz bandwidth. Under the proposed scheme, non-AP STAs associated with the AP may, by default, be monitoring P80 in which the PD channel and SIG content channel are located. For instance, each of EHT STA1, EHT STA2 and EHT STA3 may be monitoring P80 to detect preamble and decode SIG content in P80. Moreover, the SIG content channel of EHT STA2 and EHT STA3, both being 160 MHz STAs, may also be assigned in S80_1 for EHT STA2 and EHT STA3 to detect preamble in P80 and decode SIG content in S80_1 other than P80. Under the proposed scheme, non-AP STAs may be assigned by or negotiated with the associated AP using explicit signaling in the PD channel and SIG content channel. For instance, EHT STA4, an 80 MHz STA, may be monitoring S80_1 with PD and SIG content channel(s) in S80_1 while EHT STA5, a 160 MHz STA, may be monitoring S80_2 with PD and SIG content channel(s) in S80_2. Under the proposed scheme, non-AP STAs having PD channel in P80 may perform EDCA for uplink transmissions, and non-AP STAs having PD channel in other segment(s) other than P80 may only be triggered for uplink transmissions.

Under a proposed scheme in accordance with the present disclosure with respect to semi-static PD and SIG content channel assignment with mixed types of STAs (e.g., legacy HE STAs and EHT STAs), legacy HE STAs in a BSS may park in the primary 80 MHz segment (P80). That is, legacy HE STAs may park in P80, with PD channel and SIG content channel also located in P80. Under the proposed scheme, an AP (e.g., STA 110) may assign or negotiate with its associated EHT STAs the PD channel and SIG content channel.

Figure 3:
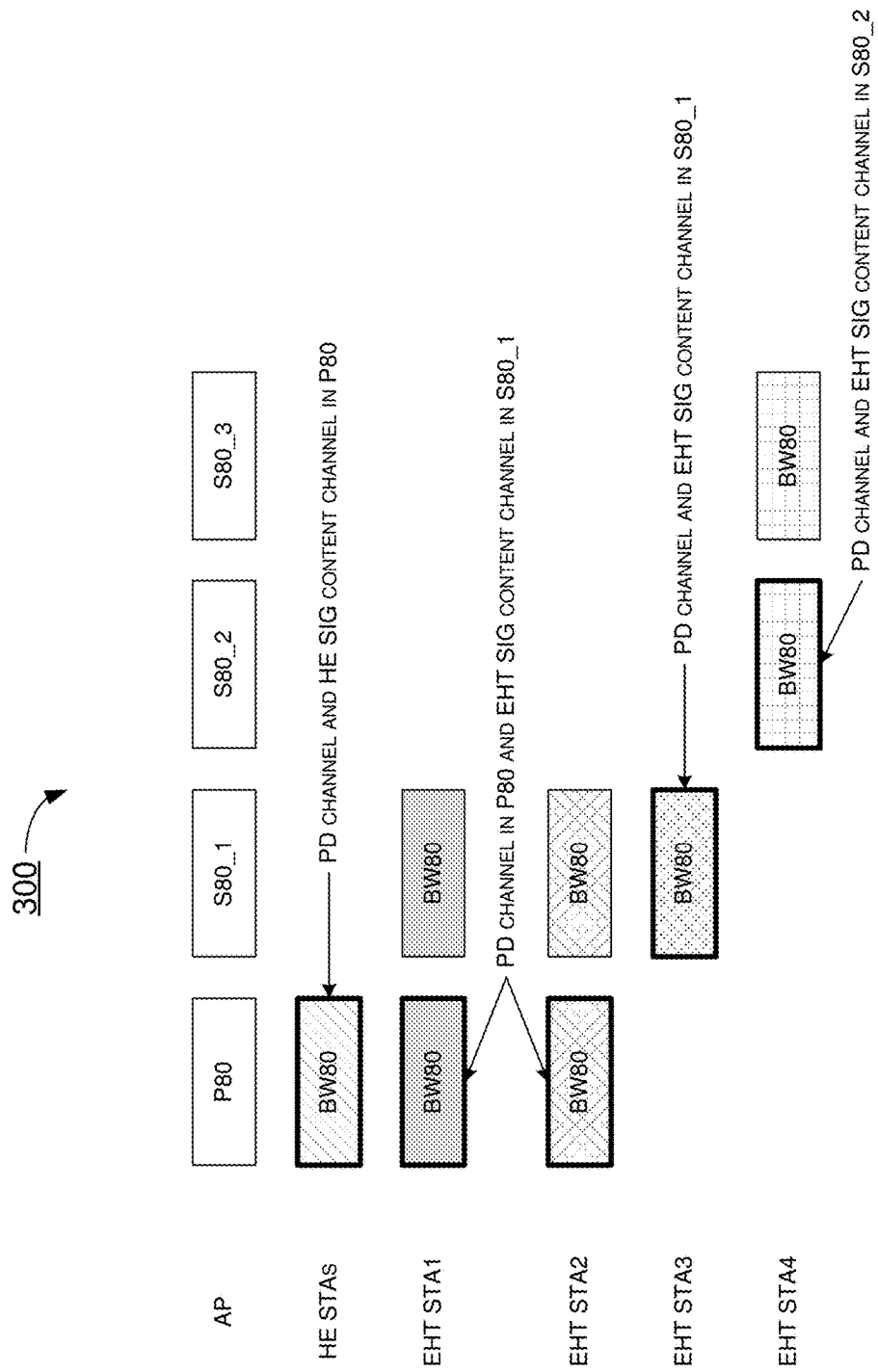
FIG. 3 is a diagram of an example scenario in accordance with the present disclosure.

FIG. 3 illustrates an example scenario 300 of semi-static PD and SIG content channel assignment with STAs of mixed types under the proposed scheme. Scenario 300 may involve multiple non-AP STAs of mixed types such as EHT STA1, EHT STA2, EHT STA3 and EHT STA4. In scenario 300, each of EHT STA1, EHT STA2 and EHT STA4 may be capable of operating in a 160 MHz bandwidth, and EHT STA3 may be capable of operating in an 80 MHz bandwidth. EHT STA1 and EHT STA2 may be monitoring P80, with PD channel located in P80 and EHT SIG content channel located in S80_1. EHT STA3 may be monitoring S80_1, with PD channel and EHT SIG content channel located in S80_1. EHT STA4 may be monitoring S80_2, with PD channel and EHT SIG content channel located in S80_2. Under the proposed scheme, HE STAs, EHT STA1 and EHT STA2 may perform EDCA for uplink transmissions when their PD channel is in P80. Moreover, EHT STA3 and EHT STA4 may only be triggered for uplink transmissions when their PD channel is not in P80.

In view of the above, with respect to semi-static PD and SIG content channel assignment, a legacy STA (e.g., an IEEE 802.11ax STA) may by default be monitoring the primary 80 MHz segment (P80) with both its PD channel and SIG content channel (e.g., HE SIG content channel) in P80. Additionally, an EHT STA may by default be monitoring P80 with both its PD channel and SIG content channel (e.g., EHT SIG content channel) in P80. Under a proposed scheme in accordance with the present disclosure, when there are legacy STAs coexisting in the system, an AP may announce the existence of legacy STAs. Moreover, the AP may semi-statically assign or negotiate with EHT STAs the PD channel and/or SIG content channel in any segment other than P80 (with PD channel and SIG content channel being in the same segment or different segments). Under the proposed scheme, in response to the AP announcing the existence of legacy STAs, each EHT STA having its SIG content channel in P80 by default may reconfigure its SIG content channel to another segment other than P80 that is within its operating bandwidth without signaling (e.g., without being assigned by or negotiated with the AP). Under the proposed scheme, a non-AP STA with its PD channel in the primary 80 MHz segment may perform EDCA for channel access.

Figure 4:
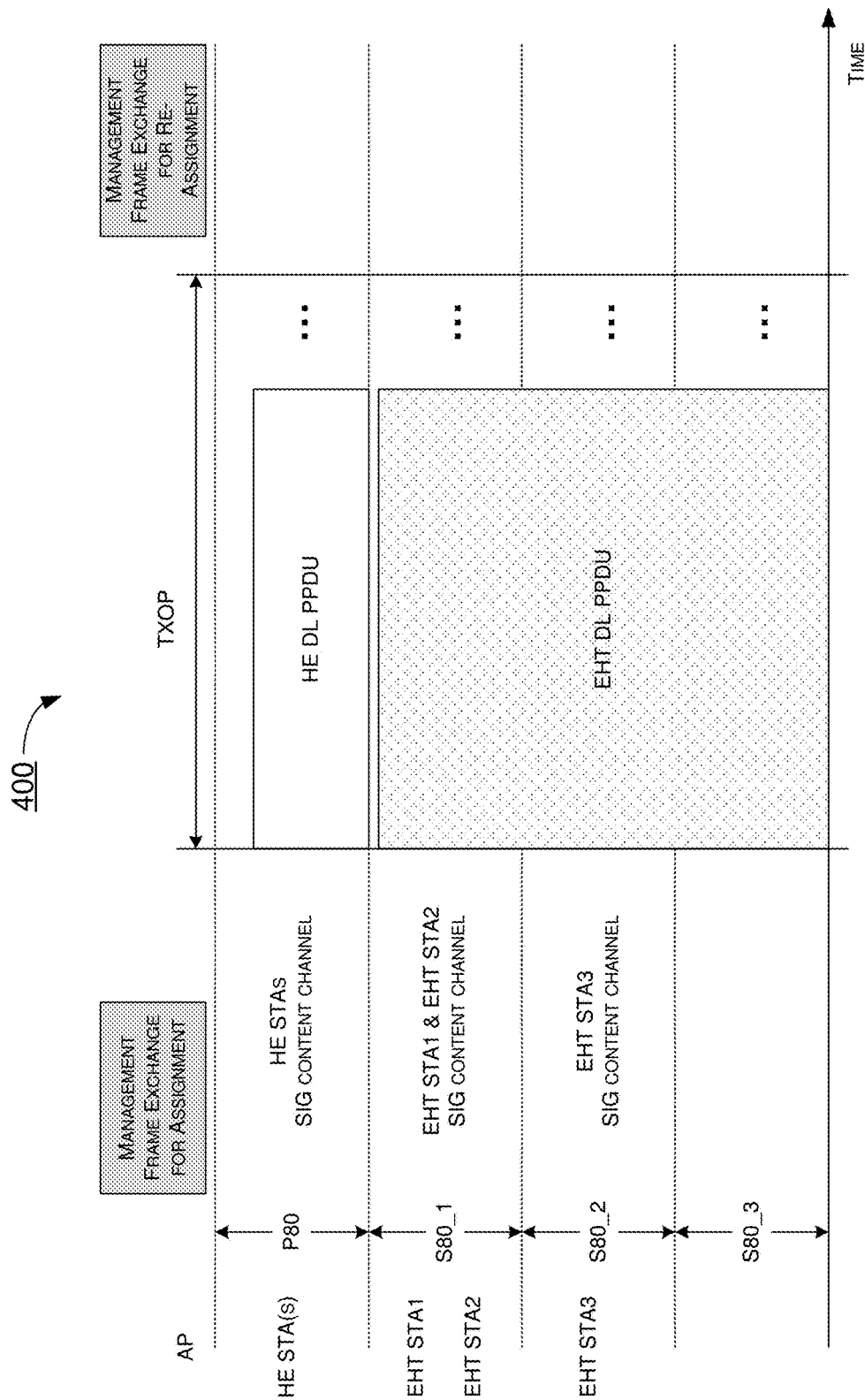
FIG. 4 is a diagram of an example scenario in accordance with the present disclosure.

FIG. 4 illustrates an example scenario 400 of semi-static PD and SIG content channel assignment under the proposed scheme. Scenario 400 may involve multiple non-AP STAs of mixed types such as EHT STA1, EHT STA2, EHT STA3 and one or more HE STAs which are associated with an AP. In scenario 400, HE STAs may be monitoring P80 and may monitor preamble in P80. EHT STA1 and EHT STA2 may monitor preamble in P80 and each may be configured to monitor its EHT SIG content channel in S80_1. EHT STA3 may monitor preamble in the assigned or negotiated PD channel in a secondary 160 MHz segment (herein interchangeably denoted as "S160"), and EHT STA3 may be configured to monitor its EHT SIG content channel in S80_2 within the secondary 160 MHz segment. In scenario 400, in a TXOP obtained by the AP, the HE STAs, EHT STA1, EHT STA2 and EHT STA3 may perform certain operations. For instance, HE STAs may detect preamble and receive HE downlink (DL) PPDU(s) in P80. EHT STA1 and EHT STA2 may detect a preamble of a PPDU in a primary 20 MHz channel in P80 and then decode the remaining part of the PPDU in S80_1. EHT STA3 may detect a preamble of a PPDU in a 20 MHz channel in the secondary 160 MHz segment and then decode the remaining part of the PPDU in the secondary 160 MHz segment. In scenario 400, a management frame exchange may be used for PD and SIG content channel assignment or re-assignment.

Under a proposed scheme in accordance with the present disclosure with respect to dynamic SIG content channel assignment, during a TXOP, an AP (e.g., STA 110) may assign the PD channel and/or SIG content channel for its associated non-AP STAs participating in transmissions during the TXOP based on at least one of a number of conditions including, for example and without limitation, aggregated PPDU with legacy STA support, dynamic preamble puncturing, and load balancing. Under the proposed scheme, the AP may initiate a TXOP and send a control frame or control information in a data frame to indicate the position of the PD channel and/or SIG content channel for a TXOP responder (e.g., a non-AP STA). The control frame or control information may be sent before data transmission for a specific TXOP responder non-AP STA. The AP may only assign the SIG content channel in case the non-AP STA does not need to switch its operating channel within the TXOP. The AP may assign the PD channel and SIG content channel to a specific TXOP responder non-AP STA in a new position in case the non-AP STA needs to switch its operating channel within the TXOP. For instance, the AP may need to add physical layer (PHY) padding (e.g., packet extension signal extension) to the PPDU carrying the control frame or the control information in order to provide extra channel switching time required for the non-AP STA.

Under the proposed scheme, a non-AP STA which is a TXOP responder may follow the PD channel and/or SIG content channel assignment indicated in the control frame or control information. In case the SIG content channel, but not the PD channel, is changed within the current STA's operating channel, then after receiving the control information the STA may decode the SIG content channel in a subsequent PPDU in a new 80 MHz segment containing the assigned SIG content channel. In case both PD channel and SIG content channel are changed to be outside of the current STA's operating channel, then after receiving the control information the STA may switch to the new operating channel during a packet extension/signal extension time of the PPDU containing the control information. The STA may detect a preamble in a subsequent PPDU in the new 80 MHz segment containing the assigned PD channel and may also decode the SIG content channel in the corresponding 80 MHz segment. After the end of the TXOP, the PD channel and/or SIG content channel assignment by the control information may be canceled, and the TXOP responder non-AP STA may resume its original PD channel and/or SIG content channel.

Figure 5:
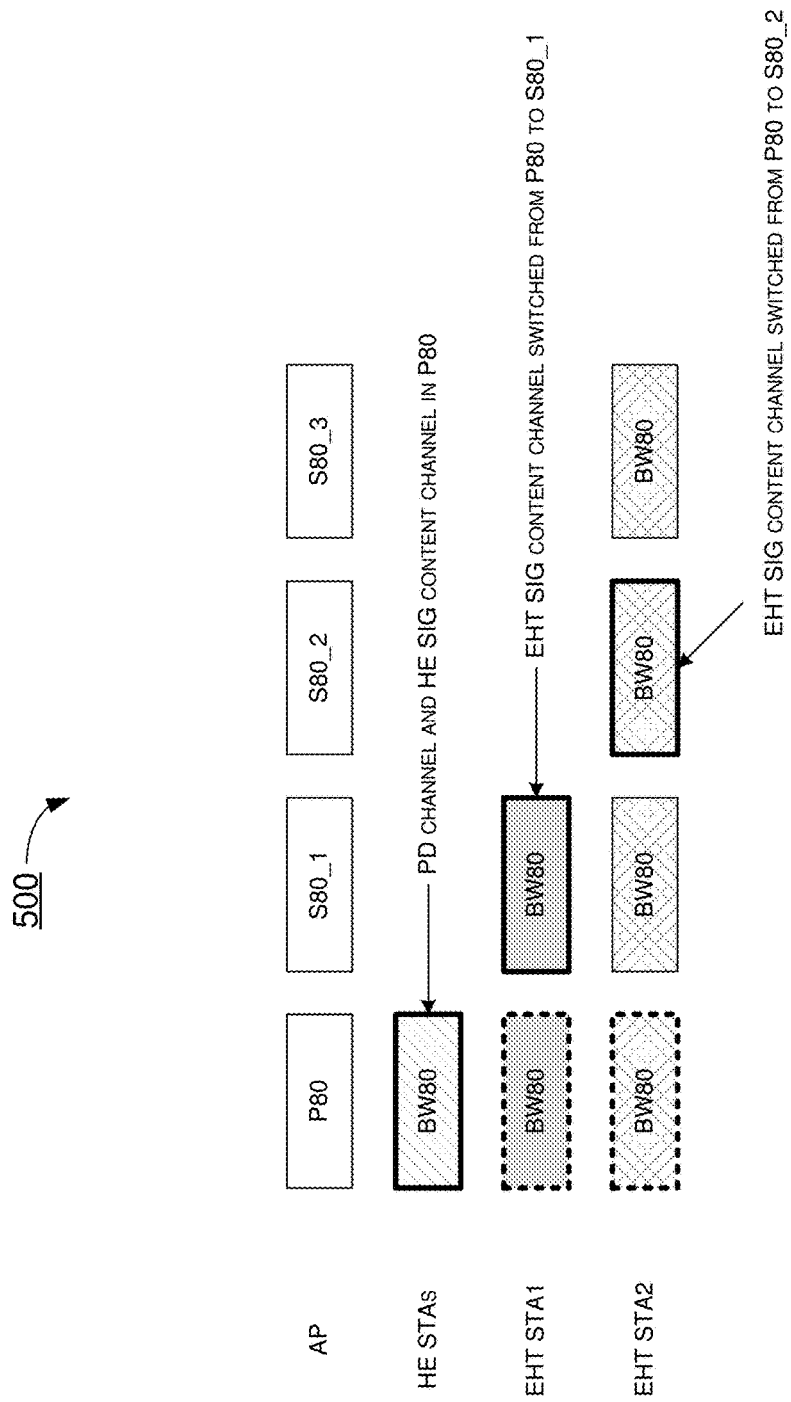
FIG. 5 is a diagram of an example scenario in accordance with the present disclosure.

FIG. 5 illustrates an example scenario 500 of dynamic SIG content channel assignment under a proposed scheme in accordance with a proposed scheme in accordance with the present disclosure. Scenario 500 may involve multiple non-AP STAs of mixed types such as EHT STA1, EHT STA2, EHT STA3 and one or more HE STAs which are associated with an AP. In scenario 500, HE PPDU(s) and EHT PPDU(s) may be aggregated in wide bandwidth transmissions. Each of EHT STA1, with a 160 MHz operating bandwidth, and EHT STA2, with a 320 MHz operating bandwidth, may be originally monitoring P80 to monitor preamble in a primary 20 MHz channel in P80, with its EHT SIG content channel originally being in P80. Each of the HE STAs may be monitoring P80 to monitor preamble in the primary 20 MHz channel, with its HE SIG content channel also being in P80. When the AP obtains a TXOP, a HE PPDU may be transmitted in P80 within the TXOP. Additionally, each of EHT STA1 and EHT STA2 may be indicated by AP to switch its EHT SIG content channel to S80_1 or S80_2, respectively. The AP may transmit an EHT PPDU1 to EHT STA1 and EHT STA2 in one of the secondary 80 MHz segments (e.g., S80_1, S80_2 or S80_3) except for P80 during the TXOP.

Figure 6:
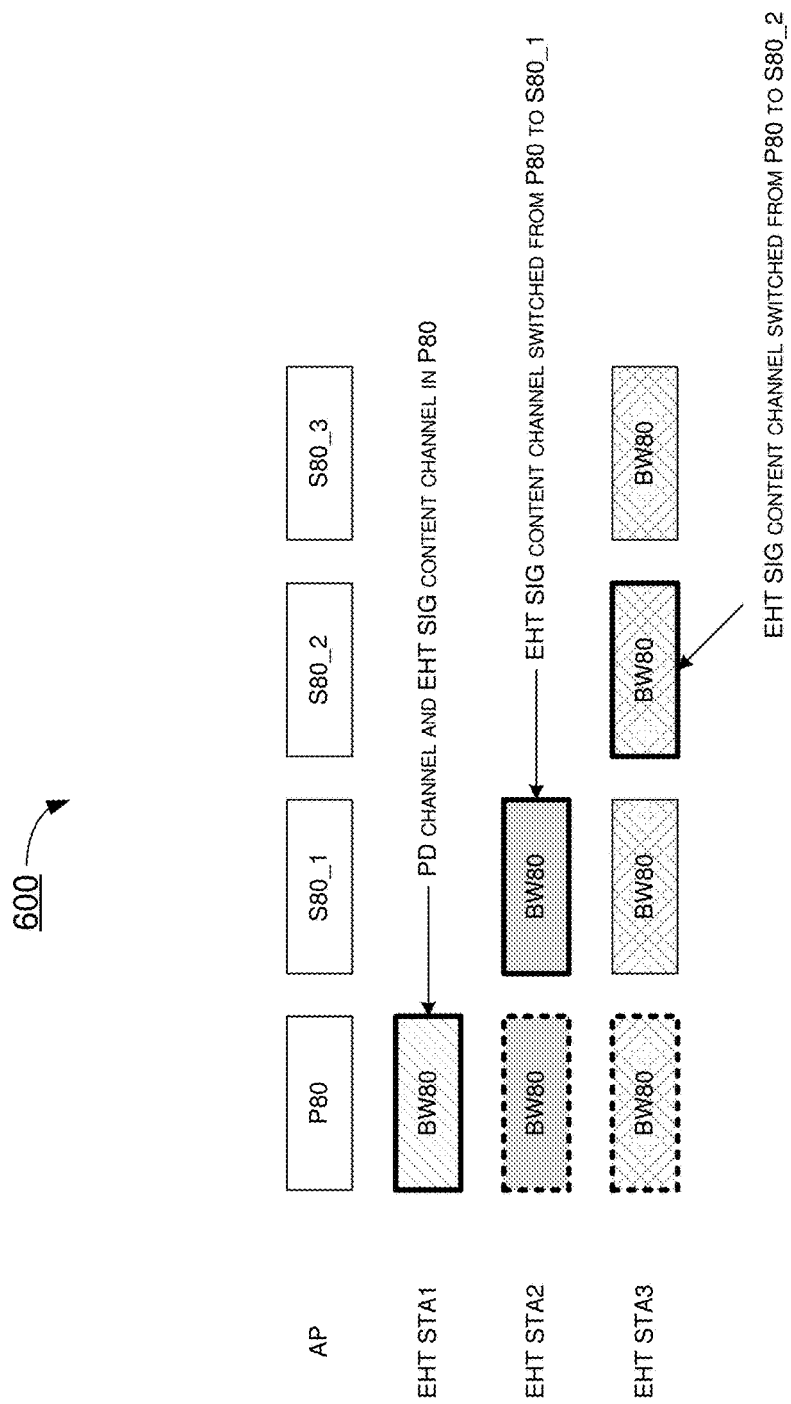
FIG. 6 is a diagram of an example scenario in accordance with the present disclosure.

FIG. 6 illustrates an example scenario 600 of dynamic SIG content channel assignment under a proposed scheme in accordance with the present disclosure. Scenario 600 may involve multiple non-AP STAs of mixed types such as EHT STA1, EHT STA2 and EHT STA3 which are associated with an AP. In scenario 600, the AP may balance the SIG content load in wide bandwidth transmissions. Each of EHT STA1, EHT STA2 and EHT STA3 may be originally monitoring P80 to monitor preamble in a primary 20 MHz channel, with its EHT SIG content channel being originally in P80. When the AP obtains a TXOP, EHT STA1, with an 80 MHz operating bandwidth, may perform reception and transmission in P80. Additionally, EHT STA2, with a 160 MHz operating bandwidth, may be indicated by the AP to switch its EHT SIG content channel to S80_1. Accordingly, EHT STA2 may detect preamble in the primary 20 MHz channel and decode its SIG content in S80_1 within the TXOP. EHT STA3, with a 320 MHz operating bandwidth, may be indicated by the AP to switch its EHT SIG content channel to S80_2. Accordingly, EHT STA3 may detect preamble in the primary 20 MHz channel and decode its SIG content channel in S80_2 within the TXOP.

Figure 7:
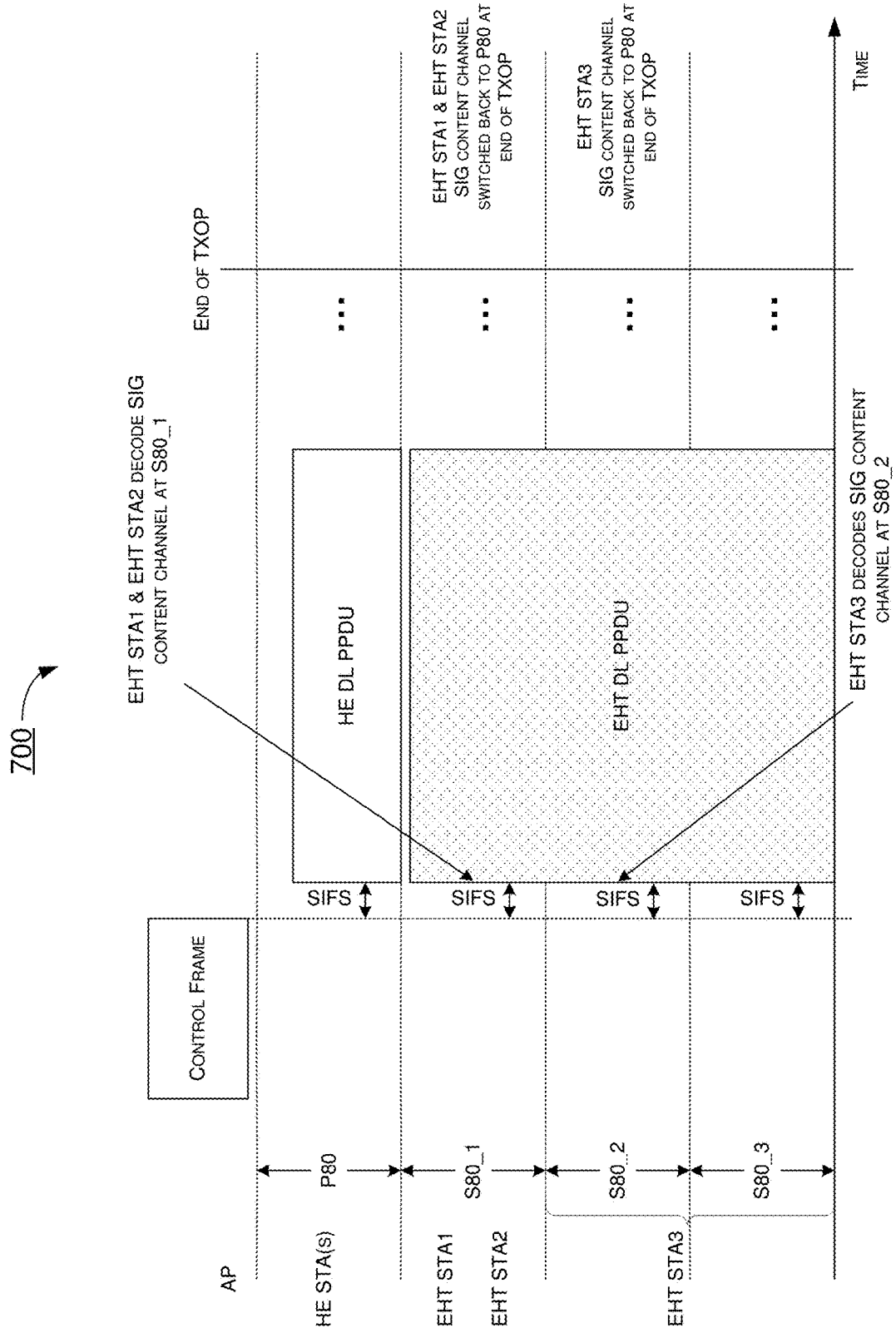
FIG. 7 is a diagram of an example scenario in accordance with the present disclosure.

FIG. 7 illustrates an example scenario 700 of frame exchange for dynamic SIG content channel assignment under a proposed scheme in accordance with the present disclosure. Scenario 700 may involve multiple non-AP STAs of mixed types such as EHT STA1, EHT STA2, EHT STA3 and one or more HE STAs which are associated with an AP. In scenario 700, the AP may obtain a TXOP and send a control frame to indicate the EHT SIG content channel for the intended recipient(s) for the current TXOP. For instance, the control frame may assign S80_1 as the EHT SIG content channel for EHT STA1 and EHT STA2, and the control frame may also assign S80_2 as the EHT SIG content channel for EHT STA3. The control frame may be transmitted at least a short interframe space (SIFS) before a data PPDU is transmitted to the intended recipient(s). the EHT SIG content channels of EHT STA1, EHT STA2 and EHT STA3 may be switched back to P80 after the end of the TXOP.

Figure 8:
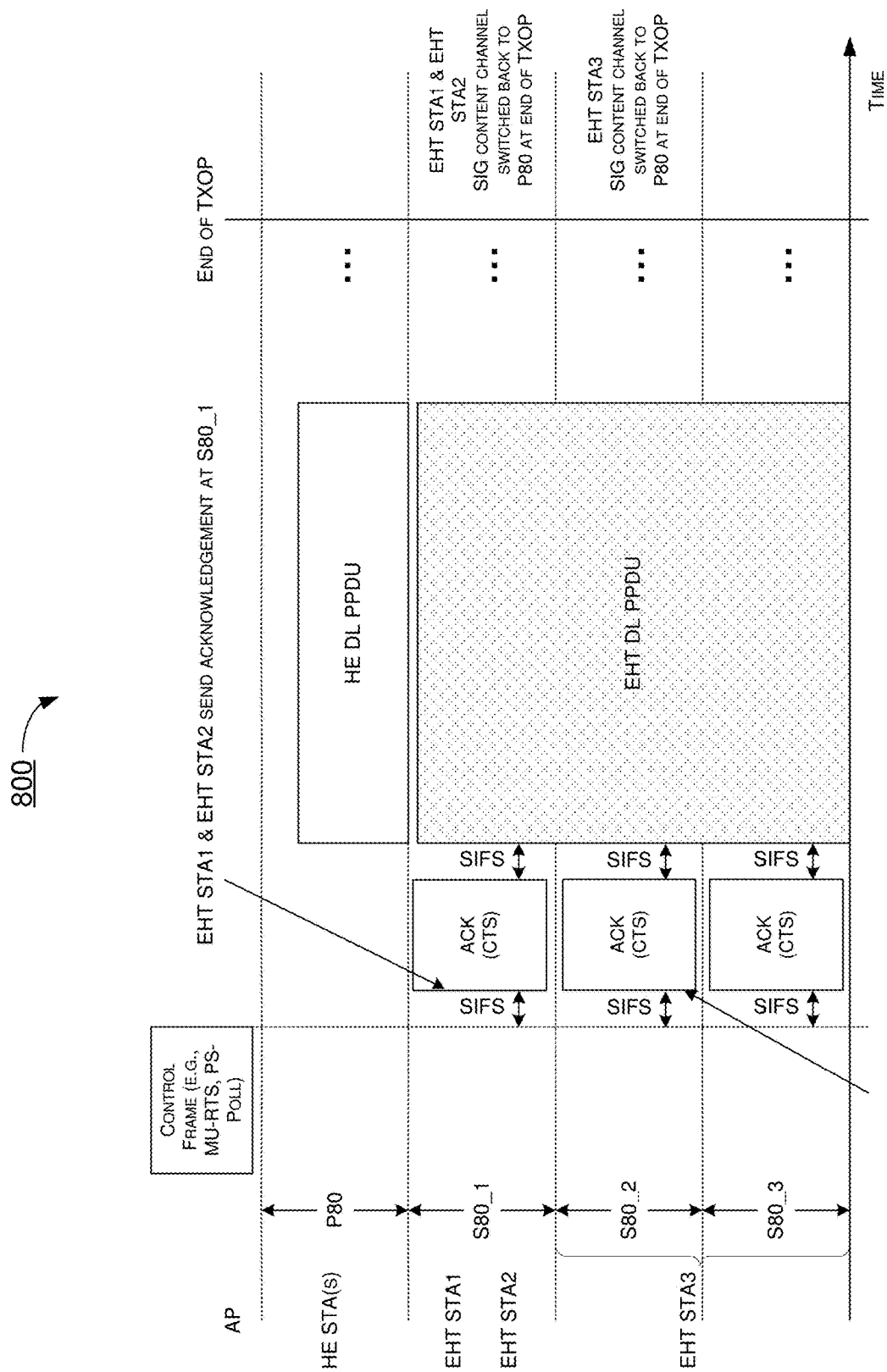
FIG. 8 is a diagram of an example scenario in accordance with the present disclosure.

FIG. 8 illustrates an example scenario 800 of frame exchange for dynamic SIG content channel assignment under a proposed scheme in accordance with the present disclosure. Scenario 800 may involve multiple non-AP STAs of mixed types such as EHT STA1, EHT STA2, EHT STA3 and one or more HE STAs which are associated with an AP. In scenario 800, a control frame may be acknowledged first by an intended recipient before the AP transmits a corresponding data PPDU to that recipient. Under the proposed scheme, the control frame may poll the intended recipient(s) to decode the EHT SIG content channel(s) in specific segment(s), and the control frame may allocate resource(s) for each intended recipient to respond its acknowledgement. Under the proposed scheme, different recipients may have different resource allocations to send acknowledgement in an orthogonal frequency-division multiplexing (OFDM) transmission format. For instance, each of EHT STA1 and EHT STA2 may send its acknowledgement in its allocated resource(s) in S80_1 without overlapping with one another. Under the proposed scheme, different recipients may have the same resource allocation to send acknowledgement in high-throughput (HT) or non-HT duplicated format. For instance, each of EHT STA1 and EHT STA2 may send its acknowledgement in non-HT duplicated format on multiple 20 MHz channels in S80_1. Under the proposed scheme, the AP may transmit data PPDU(s) at least a SIFS after receiving acknowledgement.

Figure 9:
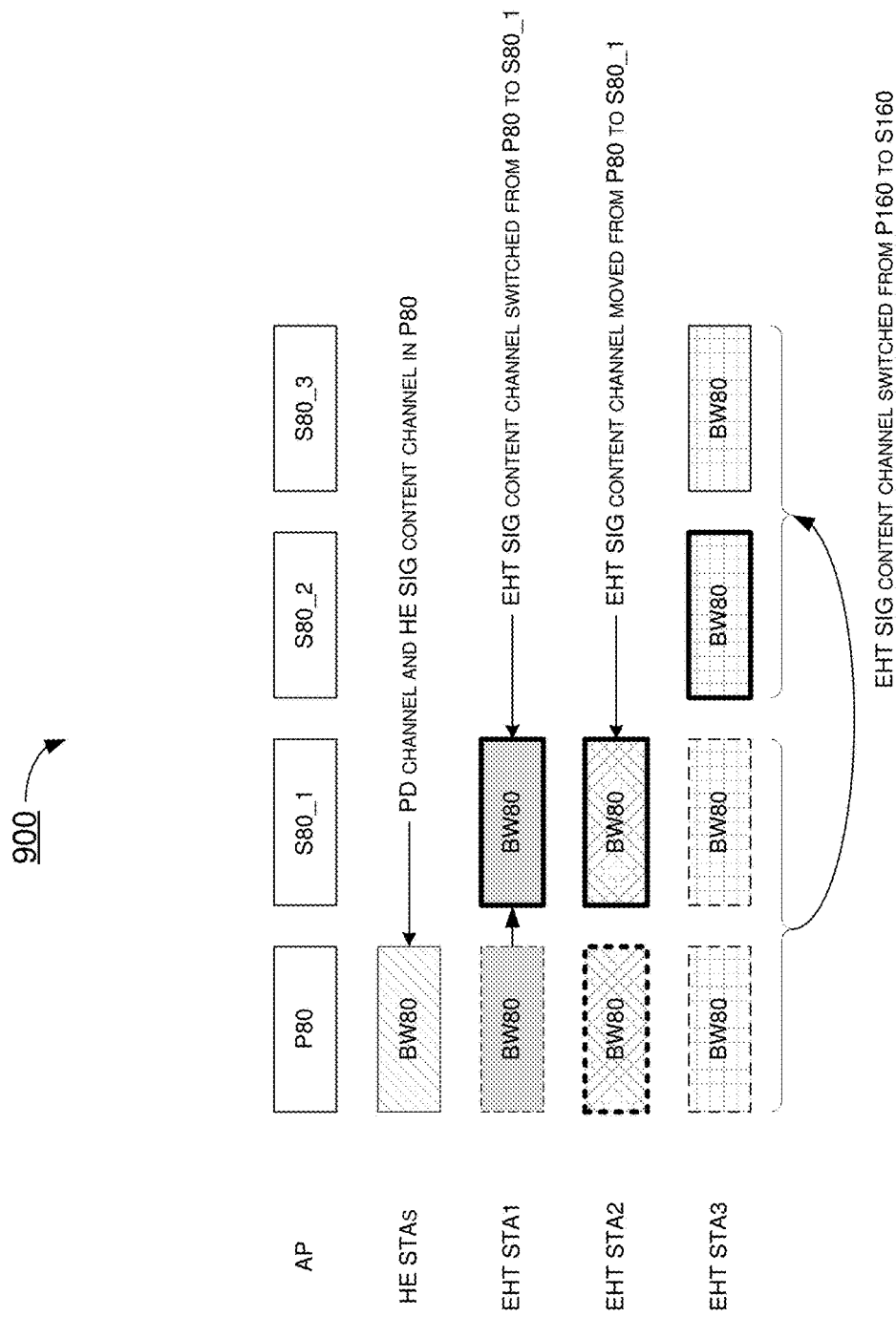
FIG. 9 is a diagram of an example scenario in accordance with the present disclosure.

FIG. 9 illustrates an example scenario 900 of dynamic channel switching under a proposed scheme in accordance with the present disclosure. Scenario 900 may involve multiple non-AP STAs of mixed types such as EHT STA1, EHT STA2, EHT STA3 and one or more HE STAs which are associated with an AP. In scenario 900, channel switching may be performed by one or more non-AP STAs in order to aggregate HE PPDU(s) and EHT PPDU(s) in wide bandwidth transmissions. Each of EHT STA1, EHT STA2 and EHT STA3 may be originally monitoring P80 to monitor preamble in a primary 20 MHz channel, with its EHT SIG content channel being originally in P80. Each of the one or more HE STAs may be monitoring P80 to monitor preamble in the primary 20 MHz channel, with its HE SIG content channel also being in P80. When the AP obtains a TXOP, an HE PPDU may be transmitted by the AP in P80 within the TXOP. Additionally, EHT STA1, with an 80 MHz operating bandwidth, may be monitoring P80 originally and then indicated by the AP to switch to S80_1 within the TXOP. Moreover, EHT STA2, with a 160 MHz operating bandwidth, may be monitoring P80 originally and then indicated by the AP to move its EHT SIG content channel to S80_1. Accordingly, EHT STA2 may detect preamble in the primary 20 MHz channel and decode SIG content in S80_1 within the TXOP. Furthermore, EHT STA3, with a 160 MHz operating bandwidth, may be monitoring P80 originally and then indicated by the AP to switch to S80_2 and S80_3 within the TXOP. Accordingly, EHT STA3 may detect preamble in the PD channel assigned in S80_2 and decode SIG content in S80_2 within the TXOP.

Figure 10:
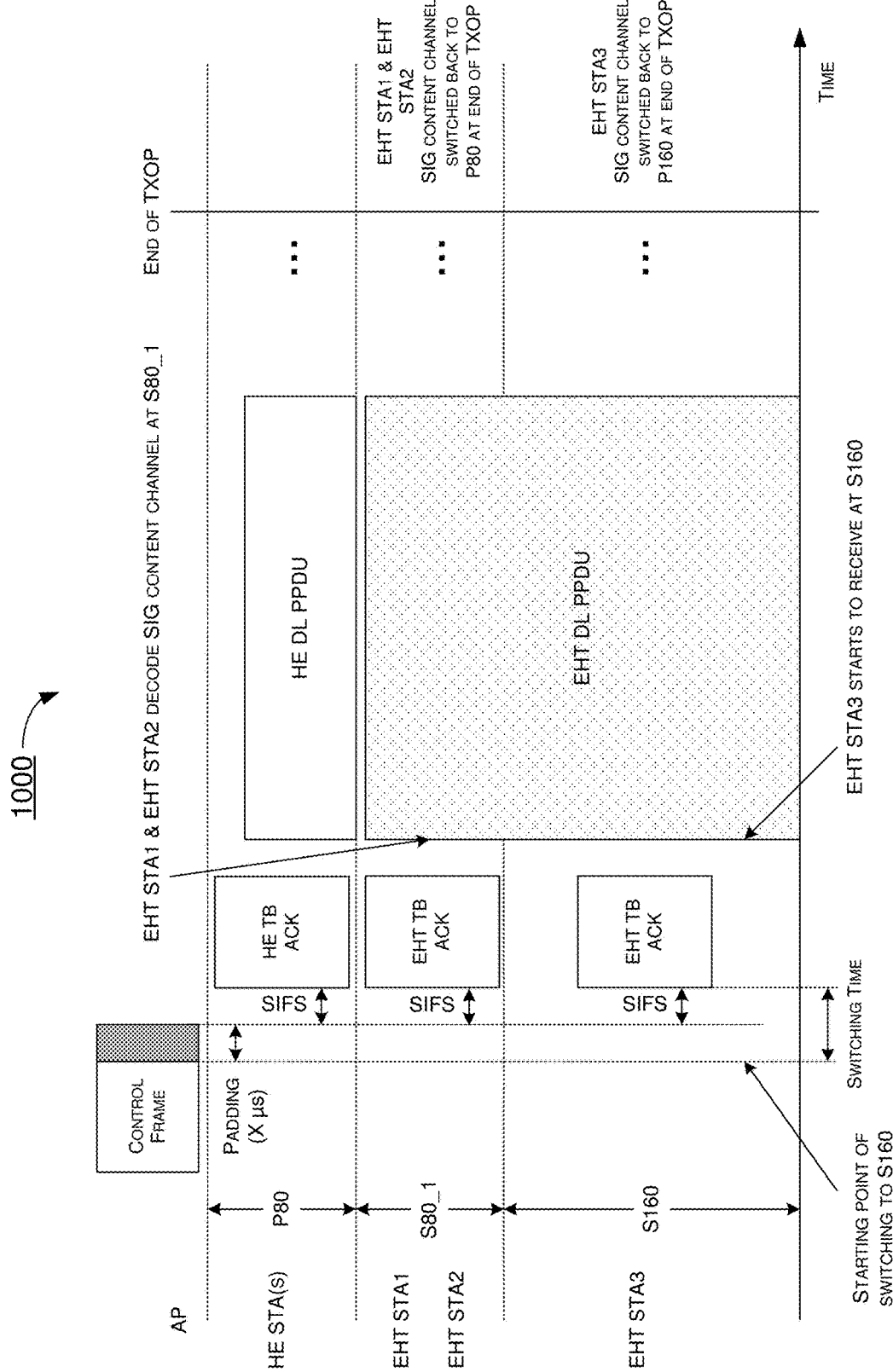
FIG. 10 is a diagram of an example scenario in accordance with the present disclosure.

FIG. 10 illustrates an example scenario 1000 of frame exchange for dynamic switching under a proposed scheme in accordance with the present disclosure. Scenario 1000 may involve multiple non-AP STAs of mixed types such as EHT STA1, EHT STA2, EHT STA3 and one or more HE STAs which are associated with an AP. In scenario 1000, the AP may obtain a TXOP and send a control frame (e.g., a multi-user request-to-send (MU-RTS) frame or a power-save poll (PS-poll) frame) to indicate channel switching to intended recipient(s) within the current TXOP. For instance, the control frame may assign S80_2 as the EHT SIG content channel for EHT STA3, and the control frame may also indicate the operating bandwidth to EHT STA3 (e.g., S80_2 and S80_3). Under the proposed scheme, the control frame may be acknowledged by the intended recipient(s) (e.g., using a clear-to-send (CTS) frame) before the AP sends data PPDU(s) to the intended recipient(s). The PPDU carrying the control frame may add packet extension or signal extension at the end of the PPDU to provide extra switching time (e.g., X microseconds). In scenario 1000, EHT STA3 may start operating channel switching from P80 and S80_1 to S80_2 and S80_3 after receiving the PPDU carrying the control frame but before the packet extension or signal extension of the PPDU, and EHT STA3 may send acknowledgement on the new operating channel. Moreover, EHT STA3 may switch its operating channel back to P80 and S80_1 after the end of the TXOP. In scenario 1000, each of the one or more HE STAs may acknowledge by transmitting a high-efficiency (HE) trigger-based (TB) acknowledgement, and each of EHT STA1, EHT STA2 and EHT STA3 may acknowledge by transmitting an EHT TB acknowledgement.

Figure 11:
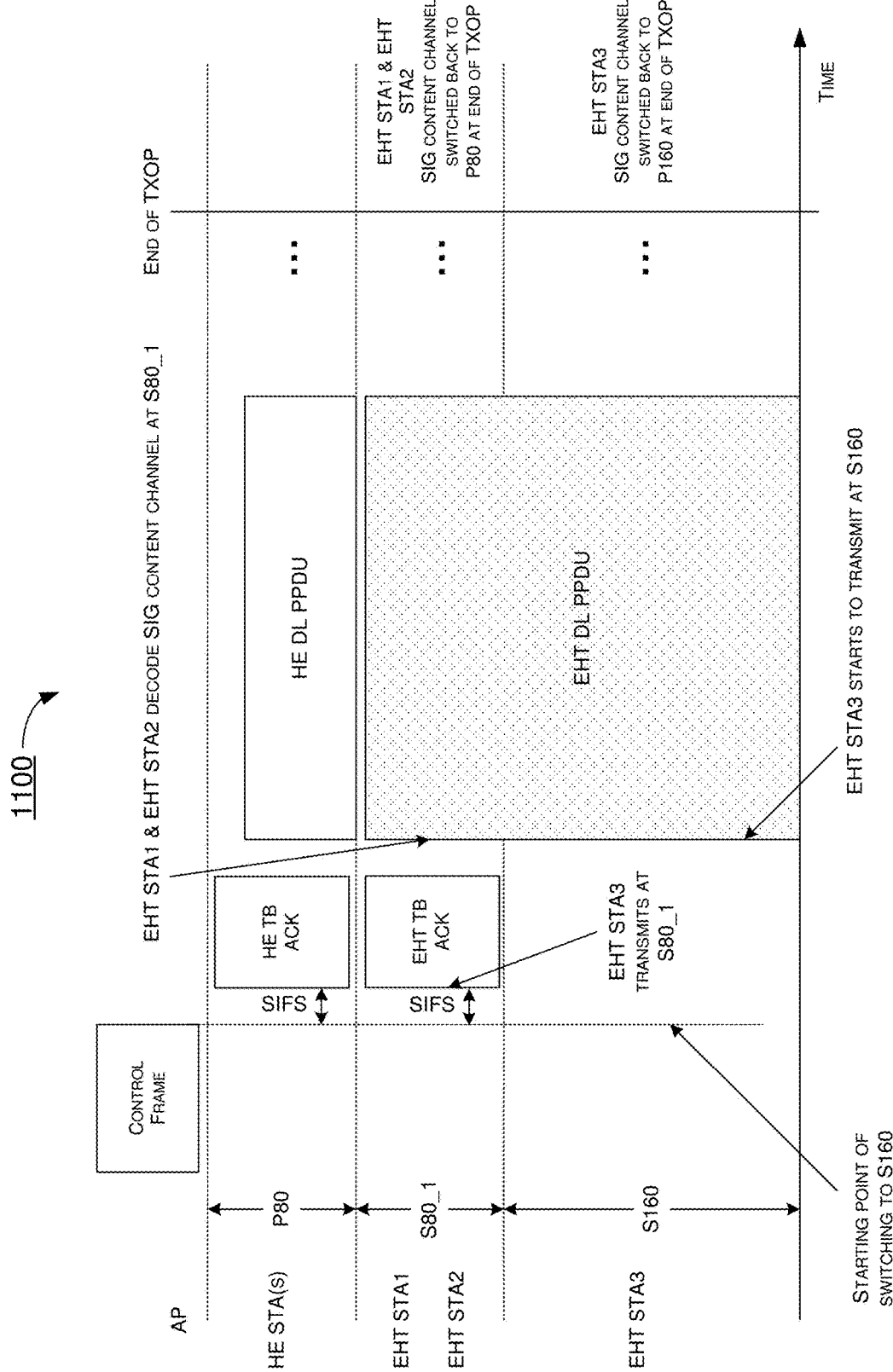
FIG. 11 is a diagram of an example scenario in accordance with the present disclosure.

FIG. 11 illustrates an example scenario 1100 of frame exchange for dynamic switching under a proposed scheme in accordance with the present disclosure. Scenario 1100 may involve multiple non-AP STAs of mixed types such as EHT STA1, EHT STA2, EHT STA3 and one or more HE STAs which are associated with an AP. In scenario 1100, a PPDU carrying the control frame may not have packet extension or signal extension added at the end of the PPDU in case of intended recipient(s) indicating its/their capability of receiving channel switching to a different channel while transmitting on a current channel. For instance, EHT STA3 may start switching its receiving channel to a secondary 160 MHz segment after receiving the PPDU carrying the control frame, and EHT STA3 may send an acknowledgement on S80_1 within a current operating channel. Moreover, EHT STA3 may switch its operating channel back to P80 and S80_1 after the end of the TXOP. In scenario 1100, each of the one or more HE STAs may acknowledge by transmitting a HE TB acknowledgement, and each of EHT STA1, EHT STA2 and EHT STA3 may acknowledge by transmitting an EHT TB acknowledgement.

Figure 12:
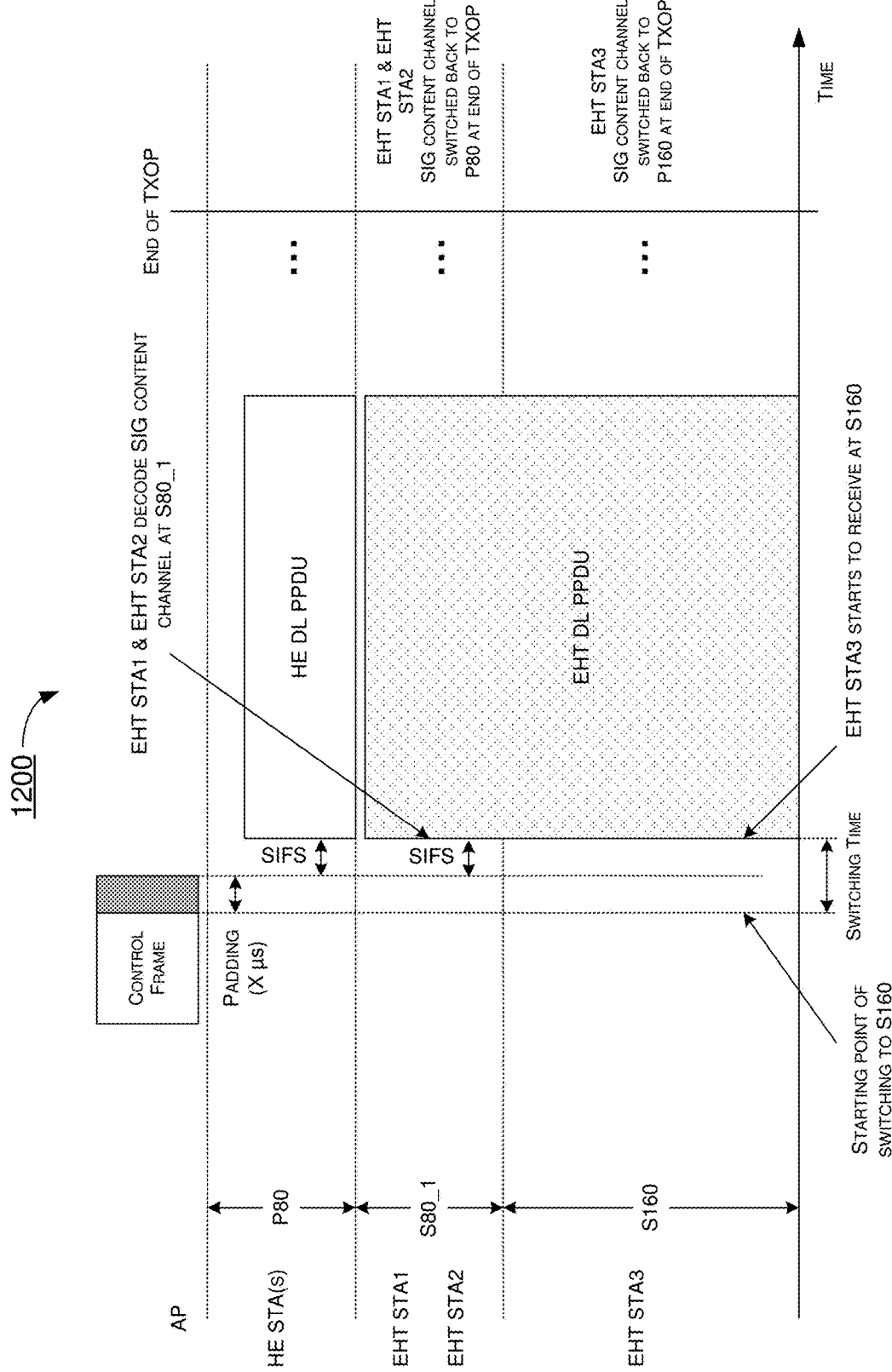
FIG. 12 is a diagram of an example scenario in accordance with the present disclosure.

FIG. 12 illustrates an example scenario 1200 of frame exchange for dynamic switching under a proposed scheme in accordance with the present disclosure. Scenario 1200 may involve multiple non-AP STAs of mixed types such as EHT STA1, EHT STA2, EHT STA3 and one or more HE STAs which are associated with an AP. In scenario 1200, the AP may obtain a TXOP and send a control frame to indicate channel switching to intended recipient(s) (e.g., EHT STA3) within the current TXOP. For instance, the control frame may be sent at least a SIFS before the AP sends data PPDU(s) to the STAs. The PPDU carrying the control frame may have packet extension or signal extension added at the end of the PPDU to provide extra switching time (e.g., X microseconds). In scenario 1200, EHT STA3 may start operating channel switching to S80_2 and S80_3 after receiving the PPDU carrying the control frame but before the packet extension or signal extension of the PPDU, and EHT STA3 may then decode a subsequent PPDU on a new operating channel in a secondary 160 MH segment. Moreover, EHT STA3 may switch its operating channel back to the primary 160 MHz segment (e.g., P80 and S80_1, herein interchangeably denoted as "P160") after the end of the TXOP.

Figure 13:
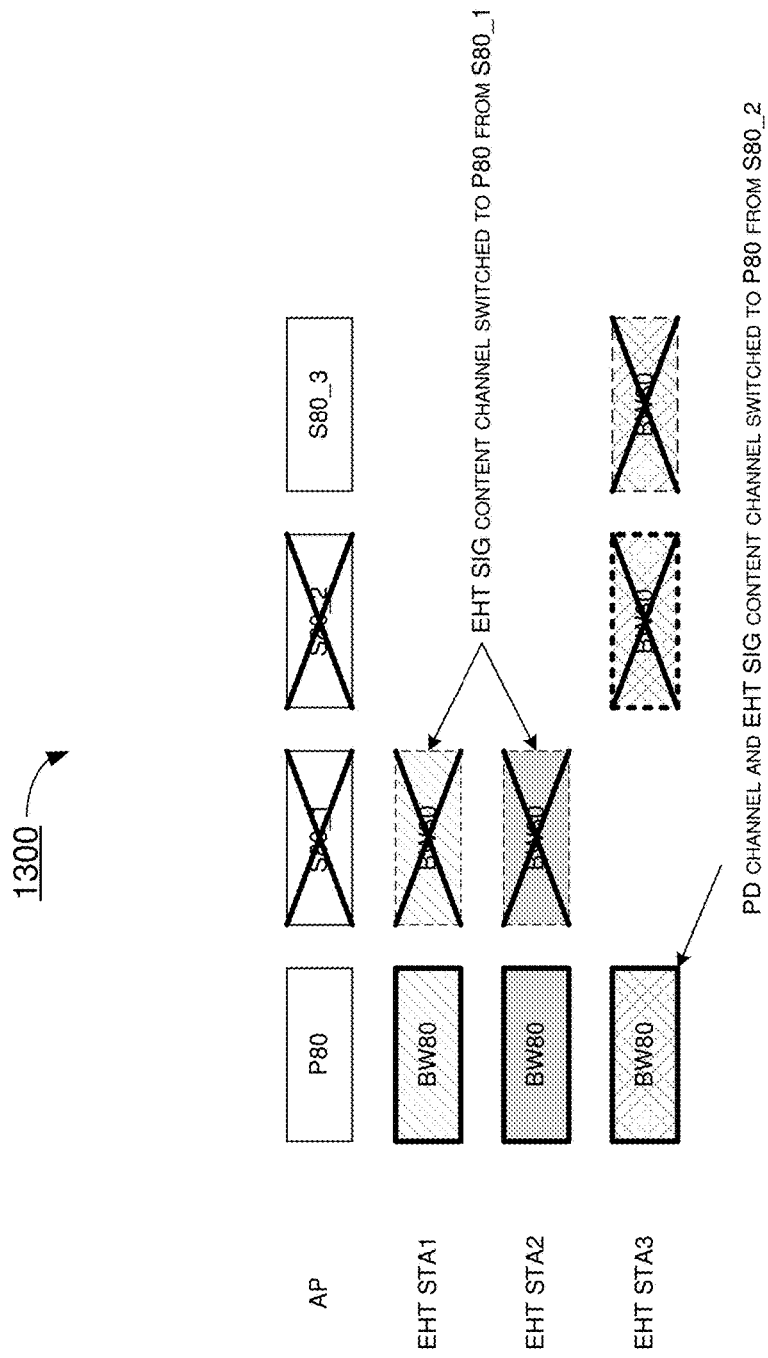
FIG. 13 is a diagram of an example scenario in accordance with the present disclosure.

FIG. 13 illustrates an example scenario 1300 of implicit SIG content channel switching under a proposed scheme in accordance with the present disclosure. Scenario 1300 may involve multiple non-AP STAs such as EHT STA1, EHT STA2 and EHT STA3 which are associated with an AP. In scenario 1300, each of EHT STA1 and EHT STA2 may be originally assigned the PD channel in P80 and EHT SIG content channel in S80_1, and EHT STA3 may be originally assigned the PD channel and SIG content channel in S80_2. When the AP obtains a TXOP, the AP may indicate that S80_1 is punctured. Accordingly, each of EHT STA1 and EHT STA2 may switch its EHT SIG content channel from S80_1 to P80 without signaling. The AP may also send channel puncturing information before the TXOP. In case S80_1 is indicated as being punctured, the EHT SIG content channel of each of EHT STA1 and EHT STA2 may be moved to P80 without EHT STA1 or EHT STA2 signaling to AP about such move until the channel puncturing information is changed. Furthermore, in case S80_2 is indicated as being punctured, EHT STA3 may perform channel switching to P80 to monitor preamble without signaling to AP about such switching until the channel puncturing information is changed.

Illustrative Implementations

Figure 14:
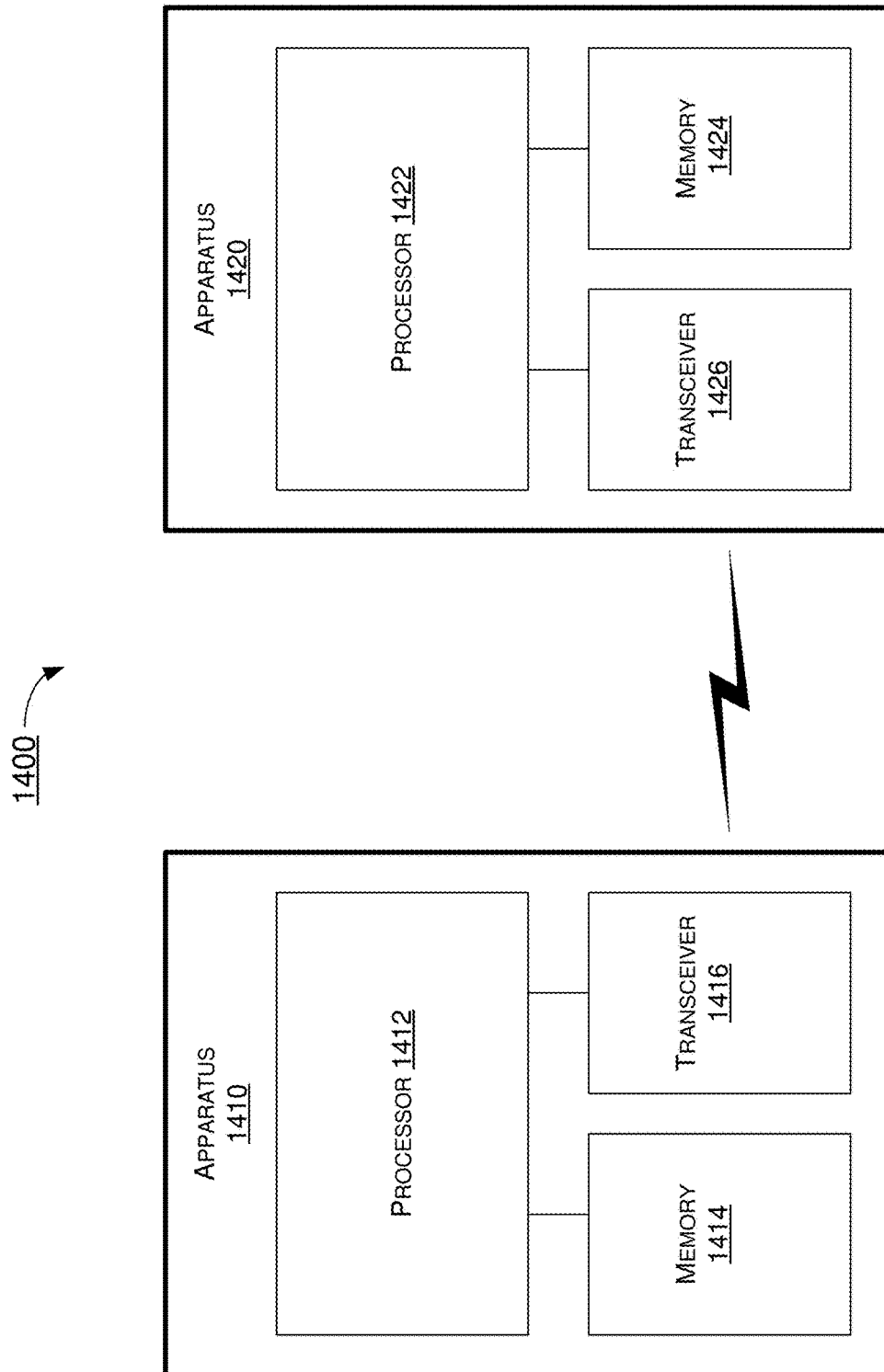
FIG. 14 is a block diagram of an example communication system in accordance with an implementation of the present disclosure.

FIG. 14 illustrates an example system 1400 having at least an example apparatus 1410 and an example apparatus 1420 in accordance with an implementation of the present disclosure. Each of apparatus 1410 and apparatus 1420 may perform various functions to implement schemes, techniques, processes and methods described herein pertaining to wide bandwidth transmission schemes in wireless communications, including the various schemes described above with respect to various proposed designs, concepts, schemes, systems and methods described above as well as processes described below. For instance, apparatus 1410 may be implemented in STA 110 and apparatus 1420 may be implemented in STA 120, or vice versa.

Each of apparatus 1410 and apparatus 1420 may be a part of an electronic apparatus, which may be a non-AP STA or an AP STA, such as a portable or mobile apparatus, a wearable apparatus, a wireless communication apparatus or a computing apparatus. When implemented in a non-AP STA, each of apparatus 1410 and apparatus 1420 may be implemented in a smartphone, a smart watch, a personal digital assistant, a digital camera, or a computing equipment such as a tablet computer, a laptop computer or a notebook computer. Each of apparatus 1410 and apparatus 1420 may also be a part of a machine type apparatus, which may be an IoT apparatus such as an immobile or a stationary apparatus, a home apparatus, a wire communication apparatus or a computing apparatus. For instance, each of apparatus 1410 and apparatus 1420 may be implemented in a smart thermostat, a smart fridge, a smart door lock, a wireless speaker or a home control center. When implemented in or as a network apparatus, apparatus 1410 and/or apparatus 1420 may be implemented in a network node, such as an AP in a WLAN.

In some implementations, each of apparatus 1410 and apparatus 1420 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 1410 and apparatus 1420 may be implemented in or as a non-AP STA or an AP STA. Each of apparatus 1410 and apparatus 1420 may include at least some of those components shown in FIG. 14 such as a processor 1412 and a processor 1422, respectively, for example. Each of apparatus 1410 and apparatus 1420 may further include one or more other components not pertinent to the proposed scheme of the present disclosure (e.g., internal power supply, display device and/or user interface device), and, thus, such component(s) of apparatus 1410 and apparatus 1420 are neither shown in FIG. 14 nor described below in the interest of simplicity and brevity.

In one aspect, processor 1412 and processor 1422 may be implemented in the form of one or more single-core processors, one or more multi-core processors, one or more RISC processors or one or more CISC processors. That is, even though a singular term "a processor" is used herein to refer to processor 1412 and processor 1422, processor 1412 and processor 1422 may include multiple processors in some implementations and a single processor in other implementations in accordance with the present disclosure. In another aspect, processor 1412 and processor 1422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, processor 1412 and processor 1422 is a special-purpose machine specifically designed, arranged and configured to perform specific tasks including those pertaining to wide bandwidth transmission schemes in wireless communications in accordance with various implementations of the present disclosure.

In some implementations, apparatus 1410 may also include a transceiver 1416 coupled to processor 1412. Transceiver 1416 may include a transmitter capable of wirelessly transmitting and a receiver capable of wirelessly receiving data. In some implementations, apparatus 1420 may also include a transceiver 1426 coupled to processor 1422. Transceiver 1426 may include a transmitter capable of wirelessly transmitting and a receiver capable of wirelessly receiving data.

In some implementations, apparatus 1410 may further include a memory 1414 coupled to processor 1412 and capable of being accessed by processor 1412 and storing data therein. In some implementations, apparatus 1420 may further include a memory 1424 coupled to processor 1422 and capable of being accessed by processor 1422 and storing data therein. Each of memory 1414 and memory 1424 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1414 and memory 1424 may include a type of read-only memory (ROM) such as mask ROM, programmable ROM (PROM), erasable programmable ROM (EPROM) and/or electrically erasable programmable ROM (EEPROM). Alternatively, or additionally, each of memory 1414 and memory 1424 may include a type of non-volatile random-access memory (NVRAM) such as flash memory, solid-state memory, ferroelectric RAM (FeRAM), magnetoresistive RAM (MRAM) and/or phase-change memory.

Each of apparatus 1410 and apparatus 1420 may be a communication entity capable of communicating with each other using various proposed schemes in accordance with the present disclosure. For illustrative purposes and without limitation, a description of capabilities of apparatus 1410, as STA 110 (e.g., an AP STA), and apparatus 1420, as STA 120 (e.g., a non-AP STA), is provided below. It is noteworthy that, although the example implementations described below are provided in the context of WLAN, the same may be implemented in other types of networks. It is also noteworthy that, although examples described below are provide in the context of apparatus 1410, the examples may also be applicable to apparatus 1420 or otherwise implemented by apparatus 1420.

Under a proposed scheme pertaining to wide bandwidth transmission schemes in wireless communications in accordance with the present disclosure, with apparatus 1410 implemented in or as STA 110 as an AP and apparatus 1420 implemented in or as STA 120 as a non-AP STA (denoted as "STA" in the description below for brevity) which initially monitors an initial PD channel and an initial SIG content channel in a same frequency segment or different frequency segments of a plurality of frequency segments in an operating bandwidth of the AP in network environment 100, processor 1412 of apparatus 1410 and processor 1422 of apparatus 1420 may communicate with each other via transceiver 1416 and transceiver 1426, respectively, with the AP assigning to the STA either or both of a PD channel and a SIG content channel for a TXOP, the PD channel and the SIG content channel assigned by the AP being different from the initial PD channel and the initial SIG content channel, respectively. In case that no PD channel is assigned for the TXOP, processor 1422, implemented in or as the STA, may monitor the initial PD channel. Additionally, processor 1412 and processor 1422 may perform a frame exchange (e.g., involving a DL and/or triggered uplink (UL) transmission) between the AP and the STA during the TXOP such that: (i) the STA monitors a preamble on the PD channel and decodes a SIG content on the SIG content channel; and (ii) after an end of the TXOP, the STA switches to a primary frequency segment of the plurality of frequency segments to monitor the initial PD channel and the initial SIG content channel.

In some implementations, the PD channel and the SIG content channel may be on a same frequency segment or different frequency segments of the plurality of frequency segments. In such cases, the PD channel may remain on the primary frequency segment and the SIG content channel may be assigned to a secondary frequency segment of the plurality of frequency segments within the operating bandwidth of the STA. Alternatively, the PD channel may be assigned to a secondary frequency segment of the plurality of frequency segments and the SIG content channel may be assigned to a different frequency segment of the plurality of frequency segments within the operating bandwidth of the STA. Still alternatively, the PD channel and the SIG content channel may be assigned to a same secondary frequency segment of the plurality of frequency segments.

In some implementations, in communicating between the AP and the STA, processor 1412 may perform either or both of a PD channel assignment and a SIG content channel assignment to the STA to have the frame exchange with the STA using a PPDU format different than a format used on the primary frequency segment.

In some implementations, in communicating between the AP and the STA, processor 1412 may assign either or both different PD channels and SIG content channels to different STAs to which different PPDU formats are applied or different frequency segments are assigned.

In some implementations, in communicating between the AP and the STA, processor 1412 may perform either or both of a PD channel assignment and a SIG content channel assignment to the STA to aggregate PPDUs of different formats (e.g., HE PPDU(s) and EHT PPDU(s)) into one transmission on different frequency segments in the operating bandwidth of the AP. Alternatively, in communicating between the AP and the STA, processor 1412 may perform a dynamic SIG content channel assignment to the STA to balance a SIG content load in the operating bandwidth of the AP.

In some implementations, in communicating between the AP and the STA, processor 1412 may perform either or both of a PD channel assignment and a SIG content channel assignment to the STA to allow segment-specific SIG content in one or more frequency segments in the operating bandwidth of the AP.

In some implementations, in communicating between the AP and the STA, processor 1412 may transmit, via transceiver 1416, a control frame or control information to the STA to assign either or both of the PD channel and the SIG content channel to the STA with either or both of the PD channel and the SIG content channel being in a secondary frequency segment of the plurality of frequency segments different than the primary frequency segment. Moreover, processor 1422 may receive, via transceiver 1426, the control frame or the control information from the AP that assigns either or both of the PD channel and the SIG content channel to the STA with either or both of the PD channel and the SIG content channel being in the secondary frequency segment of the plurality of frequency segments different than the primary frequency segment. In some implementations, the STA may receive the control frame or the control information on the primary frequency segment.

In some implementations, the control frame may be transmitted by the AP and received by the STA at least a SIFS before the DL transmission.

In some implementations, a PPDU carrying the control frame may be padded in a medium access control (MAC) payload or with a packet extension or a signal extension at an end of the PPDU to allow additional switching time.

In some implementations, the control frame or the control information may be transmitted at a beginning of the TXOP. In such cases, in communicating between the AP and the STA, processor 1422 may further perform certain operations. For instance, processor 1422 may switch either or both of the PD channel and the SIG content channel to the secondary frequency segment. Then, processor 1422 may perform the frequency exchange with the AP.

In some implementations, in communicating between the AP and the STA, processor 1412 may transmit, via transceiver 1416, a control frame to the STA to assign either or both of the PD channel and the SIG content channel to the STA with either or both of the PD channel and the SIG content channel being in a secondary frequency segment of the plurality of frequency segments different than the primary frequency segment. Moreover, processor 1422 may transmit, via transceiver 1426, an acknowledgement on at least the secondary frequency segment to the AP responsive to receiving the control frame.

In some implementations, the acknowledgement may be transmitted by the STA at least a SIFS before the DL transmission.

In some implementations, the control frame may include a MU-RTS frame or a PS-poll)frame. Additionally, the acknowledgement may include a CTS frame or an EHT TB acknowledgement.

In some implementations, a PPDU carrying the control frame may be padded with a packet extension or a signal extension at an end of the PPDU to allow additional switching time.

In some implementations, in communicating between the AP and the STA, processor 1412 may transmit, via transceiver 1416, channel puncturing information to the STA. Furthermore, processor 1422 may switch to decode the SIG content (e.g., in the primary frequency segment but not necessarily) from the SIG content channel in the primary frequency segment responsive to the channel puncturing information indicating that the initial SIG content channel is punctured.

Under a proposed scheme pertaining to wide bandwidth transmission schemes in wireless communications in accordance with the present disclosure, with apparatus 1410 implemented in or as STA 110 as an AP and apparatus 1420 implemented in or as STA 120 as a first non-AP STA in network environment 100, processor 1412 of apparatus 1410 and processor 1422 of apparatus 1420 may establish a wireless communication between the AP and the first STA with the first STA initially monitoring a primary frequency segment of a plurality of frequency segments in an operating bandwidth of the AP in a BSS which is associated with a plurality of STAs including the first STA. Moreover, processor 1412 and processor 1422 may communicate, via transceiver 1416 and transceiver 1426, respectively, to result in the first STA being assigned either or both of a first PD channel and a first SIG content channel such that the first STA monitors a preamble on the first PD channel and decodes a SIG content on the first SIG content channel during at least a predetermined period of time. In response to a first bandwidth of the first STA being different than a second bandwidth of a second STA of the plurality of STAs, at least one of a second PD channel and a second SIG content channel assigned to the second STA and at least one of the first PD channel and the first SIG content channel may be in different segments of the plurality of frequency segments. In response to a first type of the first STA being different than a second type of the second STA, the first SIG content channel may be in one of the plurality of frequency segments other than the primary frequency segment.

In some implementations, in communicating between the AP and the first STA, processor 1412 may assign or negotiate with the first STA to assign either or both of the first PD channel and the first SIG content channel to the first STA with either or both of the first PD channel and the first SIG content channel being in a secondary frequency segment of the plurality of frequency segments different than the primary frequency segment. Moreover, processor 1422 may negotiate with or be assigned by the AP either or both of the first PD channel and the first SIG content channel with either or both of the first PD channel and the first SIG content channel being in the secondary frequency segment of the plurality of frequency segments different than the primary frequency segment.

In some implementations, in communicating between the AP and the first STA, processor 1412 and processor 1422 may communicate via a management frame exchange between the AP and the first STA in either or both of a PD channel and SIG content channel assignment and a re-assignment.

In some implementations, the predetermined period of time may include a TWT or a SP.

In some implementations, in an event that the first type of the first STA is different than the second type of the second STA, the first STA may be an EHT STA and the second STA may be a HE STA.

Illustrative Processes

FIG. 15 illustrates an example process 1500 in accordance with an implementation of the present disclosure. Process 1500 may represent an aspect of implementing various proposed designs, concepts, schemes, systems and methods described above. More specifically, process 1500 may represent an aspect of the proposed concepts and schemes pertaining to wide bandwidth transmission schemes in wireless communications in accordance with the present disclosure. Process 1500 may include one or more operations, actions, or functions as illustrated by one or more of blocks 1510 and 1520. Although illustrated as discrete blocks, various blocks of process 1500 may be divided into additional blocks, combined into fewer blocks, or eliminated, depending on the desired implementation. Moreover, the blocks/sub-blocks of process 1500 may be executed in the order shown in FIG. 15 or, alternatively in a different order. Furthermore, one or more of the blocks/sub-blocks of process 1500 may be executed repeatedly or iteratively. Process 1500 may be implemented by or in apparatus 1410 and apparatus 1420 as well as any variations thereof. Solely for illustrative purposes and without limiting the scope, process 1500 is described below in the context of apparatus 1410 implemented in or as STA 110 and apparatus 1420 implemented in or as STA 120 of a wireless network such as a WLAN in network environment 100 in accordance with one or more of IEEE 802.11 standards. It is noteworthy that, although examples described below are provide in the context of apparatus 1410, the examples may also be applicable to apparatus 1420 or otherwise implemented by apparatus 1420. Process 1500 may begin at block 1510.

At 1510, process 1500 may involve processor 1412 of apparatus 1410, implemented in STA 110 as an AP, and processor 1422 of apparatus 1420, implemented in STA 120 as a non-AP STA (denoted as "STA" in the description below for brevity) which initially monitors an initial PD channel and an initial SIG content channel in a same frequency segment or different frequency segments of a plurality of frequency segments in an operating bandwidth of the AP, communicating with each other via transceiver 1416 and transceiver 1426, respectively, with the AP assigning to the STA either or both of a PD channel and a SIG content channel for a TXOP, the PD channel and the SIG content channel assigned by the AP being different from the initial PD channel and the initial SIG content channel, respectively. In case that no PD channel is assigned for the TXOP, process 1500 may also involve processor 1412 monitoring the initial PD channel. Process 1500 may proceed from 1510 to 1520.

At 1520, process 1500 may involve processor 1412 and processor 1422 performing a frame exchange between the AP and the STA during the TXOP such that: (i) the STA monitors a preamble on the PD channel and decodes a SIG content on the SIG content channel; and (ii) after an end of the TXOP, the STA switches to a primary frequency segment of the plurality of frequency segments to monitor the initial PD channel and the initial SIG content channel.

In some implementations, the PD channel and the SIG content channel may be on a same frequency segment or different frequency segments of the plurality of frequency segments. In such cases, the PD channel may remain on the primary frequency segment and the SIG content channel may be assigned to a secondary frequency segment of the plurality of frequency segments within the operating bandwidth of the STA. Alternatively, the PD channel may be assigned to a secondary frequency segment of the plurality of frequency segments and the SIG content channel may be assigned to a different frequency segment of the plurality of frequency segments within the operating bandwidth of the STA. Still alternatively, the PD channel and the SIG content channel may be assigned to a same secondary frequency segment of the plurality of frequency segments.

In some implementations, in communicating between the AP and the STA, process 1500 may involve processor 1412 performing either or both of a PD channel assignment and a SIG content channel assignment to the STA to have the frame exchange with the STA using a PPDU format different than a format used on the primary frequency segment.

In some implementations, in communicating between the AP and the STA, process 1500 may involve processor 1412 assigning either or both different PD channels and SIG content channels to different STAs to which different PPDU formats are applied or different frequency segments are assigned.

In some implementations, in communicating between the AP and the STA, process 1500 may involve processor 1412 performing either or both of a PD channel assignment and a SIG content channel assignment to the STA to aggregate PPDUs of different formats (e.g., HE PPDU(s) and EHT PPDU(s)) into one transmission on different frequency segments in the operating bandwidth of the AP. Alternatively, in communicating between the AP and the STA, process 1500 may involve processor 1412 performing a dynamic SIG content channel assignment to the STA to balance a SIG content load in the operating bandwidth of the AP.

In some implementations, in communicating between the AP and the STA, process 1500 may involve processor 1412 performing either or both of a PD channel assignment and a SIG content channel assignment to the STA to allow segment-specific SIG content in one or more frequency segments in the operating bandwidth of the AP.

In some implementations, in communicating between the AP and the STA, process 1500 may involve processor 1412 transmitting, via transceiver 1416, a control frame or control information to the STA to assign either or both of the PD channel and the SIG content channel to the STA with either or both of the PD channel and the SIG content channel being in a secondary frequency segment of the plurality of frequency segments different than the primary frequency segment. Moreover, process 1500 may involve processor 1422 receiving, via transceiver 1426, the control frame or the control information from the AP that assigns either or both of the PD channel and the SIG content channel to the STA with either or both of the PD channel and the SIG content channel being in the secondary frequency segment of the plurality of frequency segments different than the primary frequency segment. In some implementations, the STA may receive the control frame or the control information on the primary frequency segment.

In some implementations, the control frame may be transmitted by the AP and received by the STA at least a SIFS before the DL transmission.

In some implementations, a PPDU carrying the control frame may be padded in a MAC payload or with a packet extension or a signal extension at an end of the PPDU to allow additional switching time.

In some implementations, the control frame or the control information may be transmitted at a beginning of the TXOP. In such cases, in communicating between the AP and the STA, process 1500 may involve processor 1422 performing certain operations. For instance, process 1500 may involve processor 1422 switching either or both of the PD channel and the SIG content channel to the secondary frequency segment. Then, process 1500 may involve processor 1422 performing the frame exchange with the AP.

In some implementations, in communicating between the AP and the STA, process 1500 may involve processor 1412 transmitting, via transceiver 1416, a control frame to the STA to assign either or both of the PD channel and the SIG content channel to the STA with either or both of the PD channel and the SIG content channel being in a secondary frequency segment of the plurality of frequency segments different than the primary frequency segment. Moreover, process 1500 may involve processor 1422 transmitting, via transceiver 1426, an acknowledgement on at least the secondary frequency segment to the AP responsive to receiving the control frame.

In some implementations, the acknowledgement may be transmitted by the STA at least a SIFS before the DL transmission.

In some implementations, the control frame may include a MU-RTS frame or a PS-poll)frame. Additionally, the acknowledgement may include a CTS frame or an EHT TB acknowledgement.

In some implementations, a PPDU carrying the control frame may be padded with a packet extension or a signal extension at an end of the PPDU to allow additional switching time.

In some implementations, in communicating between the AP and the STA, process 1500 may involve processor 1412 transmitting, via transceiver 1416, channel puncturing information to the STA. Furthermore, process 1500 may involve processor 1422 switching to decode the SIG content (e.g., in the primary frequency segment but not necessarily) from the SIG content channel in the primary frequency segment responsive to the channel puncturing information indicating that the initial SIG content channel is punctured.

FIG. 16 illustrates an example process 1600 in accordance with an implementation of the present disclosure. Process 1600 may represent an aspect of implementing various proposed designs, concepts, schemes, systems and methods described above. More specifically, process 1600 may represent an aspect of the proposed concepts and schemes pertaining to wide bandwidth transmission schemes in wireless communications in accordance with the present disclosure. Process 1600 may include one or more operations, actions, or functions as illustrated by one or more of blocks 1610 and 1620. Although illustrated as discrete blocks, various blocks of process 1600 may be divided into additional blocks, combined into fewer blocks, or eliminated, depending on the desired implementation. Moreover, the blocks/sub-blocks of process 1600 may be executed in the order shown in FIG. 16 or, alternatively in a different order. Furthermore, one or more of the blocks/sub-blocks of process 1600 may be executed repeatedly or iteratively. Process 1600 may be implemented by or in apparatus 1410 and apparatus 1420 as well as any variations thereof. Solely for illustrative purposes and without limiting the scope, process 1600 is described below in the context of apparatus 1410 implemented in or as STA 110 and apparatus 1420 implemented in or as STA 120 of a wireless network such as a WLAN in network environment 100 in accordance with one or more of IEEE 802.11 standards. It is noteworthy that, although examples described below are provide in the context of apparatus 1410, the examples may also be applicable to apparatus 1420 or otherwise implemented by apparatus 1420. Process 1600 may begin at block 1610.

At 1610, process 1600 may involve processor 1412 of apparatus 1410, implemented in STA 110 as an AP, and processor 1422 of apparatus 1420, implemented in STA 120 as a first non-AP STA (denoted as "first STA" in the description below for brevity), establishing a wireless communication between the AP and the first STA with the first STA initially monitoring a primary frequency segment of a plurality of frequency segments in an operating bandwidth of the AP in a BSS which is associated with a plurality of STAs including the first STA. Process 1600 may proceed from 1610 to 1620.

At 1620, process 1600 may involve processor 1412 and processor 1422 communicating, via transceiver 1416 and transceiver 1426, respectively, to result in the first STA being assigned either or both of a first PD channel and a first SIG content channel such that the first STA monitors a preamble on the first PD channel and decodes a SIG content on the first SIG content channel during at least a predetermined period of time. In response to a first bandwidth of the first STA being different than a second bandwidth of a second STA of the plurality of STAs, at least one of a second PD channel and a second SIG content channel assigned to the second STA and at least one of the first PD channel and the first SIG content channel may be in different segments of the plurality of frequency segments. In response to a first type of the first STA being different than a second type of the second STA, the first SIG content channel may be in one of the plurality of frequency segments other than the primary frequency segment.

In some implementations, in communicating between the AP and the first STA, process 1600 may involve processor 1412 assigning or negotiating with the first STA to assign either or both of the first PD channel and the first SIG content channel to the first STA with either or both of the first PD channel and the first SIG content channel being in a secondary frequency segment of the plurality of frequency segments different than the primary frequency segment. Moreover, process 1600 may involve processor 1422 negotiating with or being assigned by the AP either or both of the first PD channel and the first SIG content channel with either or both of the first PD channel and the first SIG content channel being in the secondary frequency segment of the plurality of frequency segments different than the primary frequency segment.

In some implementations, in communicating between the AP and the first STA, process 1600 may involve processor 1412 and processor 1422 communicating via a management frame exchange between the AP and the first STA in either or both of a PD channel and SIG content channel assignment or a re-assignment.

In some implementations, the predetermined period of time may include a TWT or a SP.

In some implementations, in an event that the first type of the first STA is different than the second type of the second STA, the first STA may be an EHT STA and the second STA may be a HE STA.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

communicating between an access point (AP) and a station (STA), which initially monitors an initial preamble detection (PD) channel and an initial signaling (SIG) content channel in a same frequency segment or different frequency segments of a plurality of frequency segments in an operating bandwidth of the AP, with the AP assigning to the STA either or both of a PD channel and a SIG content channel for a transmission opportunity (TXOP), the PD channel and the SIG content channel assigned by the AP being different from the initial PD channel and the initial SIG content channel, respectively; and performing a frame exchange between the AP and the STA during the TXOP such that the STA monitors a preamble on the PD channel and decodes a SIG content on the SIG content channel, wherein:

the PD channel remains on a primary frequency segment of the plurality of frequency segments and the SIG content channel is assigned to a first secondary frequency segment of the plurality of frequency segments within the operating bandwidth of the STA; or the PD channel is assigned to a second secondary frequency segment of the plurality of frequency segments and the SIG content channel is assigned to a different frequency segment of the plurality of frequency segments within the operating bandwidth of the STA.

2. The method of claim 1, wherein, after an end of the TXOP, the STA monitors the initial PD channel and the initial SIG content channel.

3. The method of claim 1, wherein the communicating between the AP and the STA comprises the AP performing either or both of a PD channel assignment and a SIG content channel assignment to the STA to have the frame exchange with the STA using a physical-layer protocol data unit (PPDU) format different than a format used on a primary frequency segment of the plurality of frequency segments.

4. The method of claim 1, wherein the communicating between the AP and the STA comprises the AP assigning either or both different PD channels and SIG content channels to different STAs to which different physical-layer protocol data unit (PPDU) formats are applied or different frequency segments are assigned.

5. The method of claim 1, wherein the communicating between the AP and the STA comprises either or both of:
the AP transmitting a control frame or control information to the STA to assign either or both of the PD channel and the SIG content channel to the STA with either or both of the PD channel and the SIG content channel being in a secondary frequency segment of the plurality of frequency segments different than a primary frequency segment of the plurality of frequency segments; and
the STA receiving the control frame or the control information from the AP that assigns either or both of the PD channel and the SIG content channel to the STA with either or both of the PD channel and the SIG content channel being in the secondary frequency segment of the plurality of frequency segments different than the primary frequency segment.

6. The method of claim 5, wherein the STA receives the control frame or the control information on the primary frequency segment.

7. The method of claim 5, wherein a physical-layer protocol data unit (PPDU) carrying the control frame is padded in a medium access control (MAC) payload or with a packet extension or a signal extension at an end of the PPDU to allow additional switching time.

8. The method of claim 5, wherein the control frame or the control information is transmitted at a beginning of the TXOP, and wherein the communicating between the AP and the STA further comprises the STA, responsive to receiving the control frame or the control information, performing operations comprising:
switching either or both of the PD channel and the SIG content channel to the secondary frequency segment; and
performing the frame exchange with the AP.

9. The method of claim 1, wherein the communicating between the AP and the STA comprises:
the AP transmitting a control frame to the STA to assign either or both of the PD channel and the SIG content channel to the STA with either or both of the PD channel and the SIG content channel being in a secondary frequency segment of the plurality of frequency segments different than a primary frequency segment of the plurality of frequency segments; and
the STA transmitting an acknowledgement on at least the secondary frequency segment to the AP responsive to receiving the control frame.

10. The method of claim 9, wherein the control frame comprises a multi-user request-to-send (MU-RTS) frame or a power-save poll (PS-poll) frame, and wherein the acknowledgement comprises a clear-to-send (CTS) frame or an extreme-high-throughput (EHT) trigger-based acknowledgement.

11. The method of claim 1, wherein the communicating between the AP and the STA comprises either or both of:
the AP transmitting channel puncturing information to the STA; and
the STA switching to decode the SIG content from the SIG content channel in a primary frequency segment of the plurality of frequency segments responsive to the channel puncturing information indicating that the initial SIG content channel is punctured.

12. A method, comprising:
establishing a wireless communication between an access point (AP) and a first station (STA) with the first STA initially monitoring a primary frequency segment of a plurality of frequency segments in an operating bandwidth of the AP in a basic service set (BSS) which is associated with a plurality of STAs including the first STA; and
communicating between the AP and the first STA to result in the first STA being assigned either or both of a first preamble detection (PD) channel and a first signaling (SIG) content channel such that the first STA monitors a preamble on the first PD channel and decodes a SIG content on the first SIG content channel during at least a predetermined period of time,
wherein, responsive to a first bandwidth of the first STA being different than a second bandwidth of a second STA of the plurality of STAs, at least one of a second PD channel and a second SIG content channel assigned to the second STA and at least one of the first PD channel and the first SIG content channel are in different frequency segments of the plurality of frequency segments, and
wherein:
the first PD channel remains on a primary frequency segment of the plurality of frequency segments and the first SIG content channel is assigned to a first secondary frequency segment of the plurality of frequency segments within the operating bandwidth of the first STA; or
the first PD channel is assigned to a second secondary frequency segment of the plurality of frequency segments and the first SIG content channel is assigned to a different frequency segment of the plurality of frequency segments within the operating bandwidth of the first STA.

13. The method of claim 12, wherein the communicating between the AP and the first STA comprises either or both of:
the AP assigning or negotiating with the first STA to assign either or both of the first PD channel and the first SIG content channel to the first STA with either or both of the first PD channel and the first SIG content channel being in a secondary frequency segment of the plurality of frequency segments different than the primary frequency segment; and
the first STA negotiating with or being assigned by the AP either or both of the first PD channel and the first SIG content channel with either or both of the first PD channel and the first SIG content channel being in the secondary frequency segment of the plurality of frequency segments different than the primary frequency segment.

14. The method of claim 12, wherein the communicating between the AP and the first STA comprises communicating between the AP and the first STA via a management frame exchange between the AP and the first STA in either or both of a PD channel and SIG content channel assignment and a re-assignment.

15. The method of claim 12, wherein the predetermined period of time comprises a target wakeup time (TWT) or a service period (SP).

16. The method of claim 12, wherein, in an event that the first type of the first STA is different than the second type of the second STA, the first STA is an extreme-high-throughput (EHT) STA and the second STA is a high-efficiency (HE) STA.

17. An apparatus implementable in a station (STA), comprising:
- a transceiver configured to wirelessly communicate with an access point (AP); and
- a processor coupled to the transceiver and configured to perform operations comprising:
  - communicating, via the transceiver, between the AP and the STA, which initially monitors an initial preamble detection (PD) channel and an initial signaling (SIG) content channel in a same frequency segment or different frequency segments of a plurality of frequency segments in an operating bandwidth of the AP, with the AP assigning to the STA either or both of a PD channel and a SIG content channel for a transmission opportunity (TXOP), the PD channel and the SIG content channel assigned by the AP being different from the initial PD channel and the initial SIG content channel, respectively; and
  - performing, via the transceiver, a frame exchange between the AP and the STA during the TXOP such that the STA monitors a preamble on the PD channel and decodes a SIG content on the SIG content channel, wherein:
    - the PD channel remains on a primary frequency segment of the plurality of frequency segments and the SIG content channel is assigned to a first secondary frequency segment of the plurality of frequency segments within the operating bandwidth of the STA; or
    - the PD channel is assigned to a second secondary frequency segment of the plurality of frequency segments and the SIG content channel is assigned to a different frequency segment of the plurality of frequency segments within the operating bandwidth of the STA.

18. The apparatus of claim 17, wherein, after an end of the TXOP, the STA monitors the PD channel and the SIG content channel in a primary frequency segment of the plurality of frequency segments.

* * * * *